(12) United States Patent
Eidelson et al.

(10) Patent No.: US 9,641,609 B2
(45) Date of Patent: May 2, 2017

(54) INTEGRATED MESSAGING

(75) Inventors: Benjamin David Eidelson, San Francisco, CA (US); Colin Gibbs, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/463,496

(22) Filed: May 3, 2012

(65) Prior Publication Data

US 2013/0227030 A1 Aug. 29, 2013

Related U.S. Application Data

(60) Provisional application No. 61/604,448, filed on Feb. 28, 2012.

(51) Int. Cl.
*G06F 15/173* (2006.01)
*G06F 15/16* (2006.01)
*H04L 29/08* (2006.01)
*H04L 29/14* (2006.01)
*H04L 12/58* (2006.01)

(52) U.S. Cl.
CPC .......... *H04L 67/1095* (2013.01); *H04L 51/14* (2013.01); *H04L 69/40* (2013.01)

(58) Field of Classification Search
CPC ... H04L 47/728; H04L 47/743; H04L 51/066; H04L 69/18; H04L 29/04; H04L 29/06163
USPC ................. 709/205, 206, 230, 232, 244, 239
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,195,686 B1 * | 2/2001 | Moon et al. | 709/206 |
| 6,459,907 B1 * | 10/2002 | Feli | 455/557 |

(Continued)

FOREIGN PATENT DOCUMENTS

WO WO0279984 10/2002

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Madhu Woolcock
(74) *Attorney, Agent, or Firm* — Troutman Sanders LLP; James E. Schutz; Christopher W. Glass

(57) ABSTRACT

An system, apparatus, and methods for integrated messaging are disclosed. The apparatus may include a user interface engine, an authorization module and a messaging module. The user interface engine receives input describing a recipient and a message to be received by the recipient. The authorization module generates an authorization signal indicating whether the recipient is authorized to exchange messages via a group messaging engine. The authorization module is coupled to the user interface engine to receive the input describing the recipient. The messaging module selectively transmits the message for dispatch to a user device of the recipient via the group messaging engine or a fallback messaging service based at least in part on the authorization signal. The messaging module is coupled to the authorization module to receive the authorization signal and coupled to the user interface engine to receive the input describing the recipient and the message.

18 Claims, 10 Drawing Sheets

(56) References Cited

U.S. PATENT DOCUMENTS

| | | | |
|---|---|---|---|
| 6,549,937 B1* | 4/2003 | Auerbach et al. | 709/206 |
| 6,564,261 B1* | 5/2003 | Gudjonsson et al. | 709/227 |
| 6,697,478 B1 | 2/2004 | Meldrum et al. | |
| 6,714,793 B1* | 3/2004 | Carey et al. | 455/466 |
| 6,754,322 B1 | 6/2004 | Bushnell | |
| 6,970,711 B2* | 11/2005 | Mizell et al. | 455/466 |
| 7,016,978 B2* | 3/2006 | Malik et al. | 709/246 |
| 7,106,848 B1 | 9/2006 | Barlow et al. | |
| 7,257,731 B2* | 8/2007 | Hunt et al. | 714/4.4 |
| 7,366,512 B1* | 4/2008 | Kefalas et al. | 455/435.2 |
| 7,366,990 B2 | 4/2008 | Pitroda | |
| 7,555,110 B2 | 6/2009 | Dolan et al. | |
| 7,603,379 B2* | 10/2009 | Kang et al. | |
| 7,610,287 B1 | 10/2009 | Dean et al. | |
| 7,742,468 B2 | 6/2010 | Vagelos | |
| 8,391,136 B1 | 3/2013 | Eidelson et al. | |
| 8,892,726 B2* | 11/2014 | Shacham | G06F 9/544 709/224 |
| 2002/0137490 A1 | 9/2002 | Gallant | |
| 2002/0143874 A1 | 10/2002 | Marquette et al. | |
| 2003/0003953 A1* | 1/2003 | Houplain | 455/553 |
| 2004/0032876 A1* | 2/2004 | Garg et al. | 370/443 |
| 2004/0219935 A1* | 11/2004 | McCann et al. | 455/466 |
| 2004/0258220 A1 | 12/2004 | Levine et al. | |
| 2005/0078619 A1* | 4/2005 | McClendon | H04W 4/08 370/312 |
| 2005/0152521 A1 | 7/2005 | Liljestrand | |
| 2005/0207390 A1* | 9/2005 | Soheili et al. | 370/349 |
| 2006/0026288 A1 | 2/2006 | Acharya et al. | |
| 2006/0046654 A1* | 3/2006 | Shiozawa | H04W 4/08 455/41.2 |
| 2006/0077957 A1 | 4/2006 | Reddy et al. | |
| 2006/0206604 A1 | 9/2006 | O'Neil et al. | |
| 2006/0240850 A1* | 10/2006 | Kaplan | 455/466 |
| 2007/0055877 A1* | 3/2007 | Persson | H04L 63/0272 713/171 |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0123686 A1* | 5/2008 | Lee | H04L 51/066 370/466 |
| 2008/0127202 A1* | 5/2008 | Stall | G06F 9/485 719/313 |
| 2008/0192656 A1 | 8/2008 | Vagelos | |
| 2008/0244023 A1* | 10/2008 | Guedalia | H04L 12/1827 709/206 |
| 2009/0061825 A1* | 3/2009 | Neelakantan | H04L 29/12292 455/412.1 |
| 2009/0129372 A1* | 5/2009 | Pandey et al. | 370/352 |
| 2009/0197622 A1* | 8/2009 | Atarius | 455/466 |
| 2009/0253445 A1* | 10/2009 | Bettis et al. | 455/466 |
| 2009/0307299 A1* | 12/2009 | Malesich | H04L 41/145 709/202 |
| 2009/0327497 A1* | 12/2009 | Itshaki et al. | 709/227 |
| 2010/0094710 A1* | 4/2010 | Ramakrishna | 705/14.64 |
| 2010/0159868 A1* | 6/2010 | Seymour | 455/404.1 |
| 2010/0167762 A1* | 7/2010 | Pandey et al. | 455/466 |
| 2010/0325470 A1* | 12/2010 | Underwood et al. | 714/2 |
| 2011/0072099 A1* | 3/2011 | Harju et al. | 709/206 |
| 2011/0098156 A1 | 4/2011 | Ng et al. | |
| 2011/0136492 A1* | 6/2011 | Bailey et al. | 455/445 |
| 2011/0153743 A1* | 6/2011 | Lindner et al. | 709/204 |
| 2011/0238766 A1* | 9/2011 | Lew et al. | 709/206 |
| 2012/0110191 A1* | 5/2012 | Johansson | 709/227 |
| 2012/0178480 A1* | 7/2012 | Patel et al. | 455/466 |
| 2012/0215854 A1* | 8/2012 | Keast | G06Q 10/107 709/206 |
| 2013/0080541 A1* | 3/2013 | Herbert | H04L 51/066 709/206 |
| 2013/0101107 A1* | 4/2013 | DeJana | H04L 12/1822 379/204.01 |

OTHER PUBLICATIONS

Agarwal et al., "Enabling Real-Time User Interests for Next Generation Activity-Oriented Social Networks," Thesis submitted to the Indian Institute of Technology Delhi,Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Different Types of Mobile Messages—Technical Information about SMS Text Messaging Displays, Internet, retrieved at http://www.pangolinsms.com/tech02-types-of-mobile-messages.htm, Sep. 21, 2011, 4 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 11, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

(56) References Cited

OTHER PUBLICATIONS

Neumann et al., "Semantic social network portal for collaborative online communities," Journal of European Industrial Training, 2005, Emerald Group Publishing, Limited, vol. 29, No. 6, pp. 472-487.
Ring Central, Inc., Internet, retrieved at http://www.ringcentral.com, Apr. 19, 2007, 1 pg.
SMS Gateway, Wikipedia, retrieved at http://en.wikipedia.org/wiki/SMS_gateway, Sep. 21, 2011, 4 pgs.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twigger, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.
Heer et al., "Vizster: Visualizing Online Social Networks," University of California, Berkeley, 8 pages (Oct. 2005).
Singh et al., "CINEMA: Columbia InterNet Extensible Multimedia Architecture," Department of Computer Science, Columbia University, pp. 1-83 (2000).

\* cited by examiner

INTEGRATED MESSAGING

CROSS-REFERENCE TO RELATED APPLICATION

This application claims the benefit under 35 U.S.C. §119 (e) of U.S. Provisional Application No. 61/604,448, entitled "Integrated Messaging" filed on Feb. 28, 2012, the entire contents of which are incorporated herein by reference.

TECHNICAL FIELD

The present disclosure relates to electronic communication. In particular, the present disclosure relates to a system, methods and apparatus for integrated messaging.

BACKGROUND

Social networks and other types of electronic communication can connect users by providing them with functionality for viewing and commenting on each other's social stream. Other features to facilitate messaging between members of a social network have also been developed.

While users can access these social networks on their portable electronic devices, such as smartphones and tablets, via the Internet, Internet access from these portable electronic devices can, at times, be unavailable or intermittent and prevent users from sending or receiving messages to one another. Additionally, a user might be required to open and close several applications to determine whether messages can be sent or received, and may be limited to sending or receiving messages when access to the Internet is again available.

Current implementations have been limited in providing a more reliable and seamless messaging experience.

SUMMARY

The present disclosure overcomes the deficiencies and limitations described in the Background section at least in part by providing a system, methods and apparatus for integrated messaging. In one innovative aspect, the apparatus may include a processor, a memory coupled to the processor, a user interface engine, an authorization module and a messaging module. The user interface engine is stored in the memory and executable by the processor to receive input describing a recipient and a message to be received by the recipient. The authorization module is stored in the memory and executable by the processor to generate an authorization signal indicating whether the recipient is authorized to exchange messages via a group messaging engine. The authorization module is coupled to the user interface engine to receive the input describing the recipient. The messaging module is stored in the memory and executable by the processor to selectively transmit the message for dispatch to a user device of the recipient via the group messaging engine or a fallback messaging service based at least in part on the authorization signal. The messaging module is coupled to the authorization module to receive the authorization signal and coupled to the user interface engine to receive the input describing the recipient and the message.

In another innovative aspect, a computer-implemented method for integrated messaging includes receiving user input describing a recipient and a message to be received by the recipient, and determining whether the recipient is authorized to exchange messages via a group messaging engine. The group messaging engine is configured to exchange messages between two or more users using a native messaging protocol. The message is transmitted for dispatch using the native messaging protocol to a user device of the recipient via the group messaging engine if the recipient is determined to be authorized and is transmitted using a fallback messaging protocol for dispatch to the user device of the recipient via a fallback messaging service if the recipient is determined not to be authorized.

Other aspects include corresponding systems, methods and apparatus, including computer program products. The systems, methods and apparatus disclosed below are advantageous in a number of respects. For example, they provide a mechanism for a user to backup and retrieve messages sent via various fallback messaging services, provide a mechanism to send and receive messages on a user device even if the user device is unable to connect to a network such as the Internet, provide a mechanism to exchange messages between users of a messaging group using various messaging services, and provide a seamless user messaging experience even if messages have been sent via a fallback messaging service. However, this summary of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
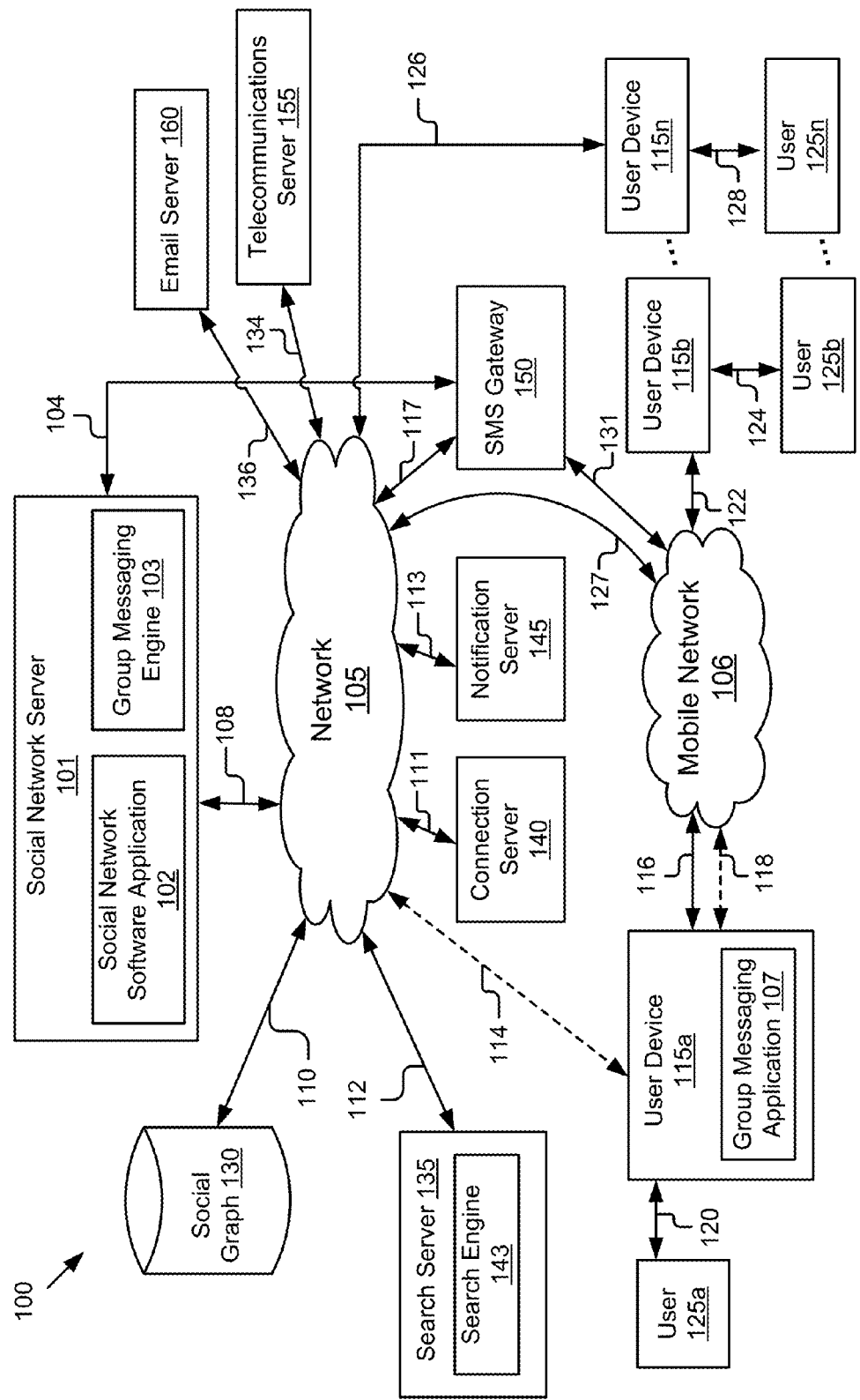
FIG. 1 is a block diagram illustrating a system for integrated messaging according to some embodiments of the present disclosure.

FIG. 1 is a block diagram illustrating a system 100 for integrated messaging according to some embodiments of the present disclosure. The architecture of system 100 includes a social network server 101, a network 105, a mobile network 106, user devices 115a, 115b . . . 115n (also referred to herein individually and collectively as 115) that are accessible by users 125a, 125b . . . 125n (also referred to herein individually and collectively as 125), a social graph 130, a search server 135, a connection server 140, a notification server 145, an SMS gateway 150, a telecommunications server 155 and an email server 160. In the illustrated embodiment, the entities 101, 115, 130, 135, 140, 145, 150, 155 and 160 are electronically communicatively coupled via the network 105, the entities 115 and 150 are electronically communicatively coupled via the mobile network 106, and the network 105 and mobile network 106 are coupled for electronic communication via signal line 127. However, the present disclosure is not limited to this configuration and the entities of system 100 may be interconnected via one hybrid network which combines network 105 and mobile network 106, or connected to and/or interconnected by any number of networks 105 and mobile networks 106. While the present disclosure is described above primarily in the context of activities related to electronic messaging, the present disclosure is applicable to any type of electronic communication between entities of a network.

The social network server 101 is a server for providing a social networking service. In the depicted embodiment, the social network server 101 is coupled to the network 105 via signal line 108. In some embodiments, the social network server 101 includes one or more processors and one or more storage devices storing data or instructions for execution by the one or more processors. For example, the social network server 101 is a server, a server array or any other computing device, or group of computing devices, having data processing, storing and communication capabilities. In other embodiments, the social network server 101 is a virtual server (i.e., a virtual machine) implemented via software. For example, the virtual server operates in a host server environment and accesses the physical hardware of the host server including, for example, a processor, memory, storage, network interfaces, etc., via an abstraction layer (e.g., a virtual machine manager). The social network server 101 interacts with the other entities 106, 115, 130, 135, 140, 145, 150, 155 and 160 of the system 100 via the network 105. In other embodiments, the social network server 101 is coupled to and interacts with the SMS gateway 150 directly via signal line 104. The social network server 101 is also coupled for communication with the user devices 115a, 115b . . . 115n via, for example, the network 105, a combination of the network 105 and the mobile network 106, or the mobile network 106 via a dedicated signal path. It should be understood that the social network server 101 can be stored in any combination of the devices and servers, or in only one of the devices or servers.

The social network server 101 includes a social network software application 102. The social network software application 102 is software including routines for providing functionality for a social network. In some embodiments, the social network software application 102 is a set of instructions executable by the processor 235 (see FIG. 2) for providing the functionality for the social network. In other embodiments, the social network software application 102 is stored in the memory 237 (see FIG. 2) of the social network server 101 and is executable by the processor 235 (see FIG. 2). In the foregoing embodiments, the social network software application 102 may be adapted for cooperation and communication with the processor 235 (see FIG. 2) and the other components of the social network server 101 via the bus 220 (see FIG. 2). Although only one social network server 101 is shown, multiple social network servers 101 may be included in the system 100.

A social network is any type of social structure where the users are connected by one or more common features. The common features include relationships/connections, e.g., friendship, family, work, an interest, etc. The common features are provided by one or more social networking systems, such as those included in the system 100, including explicitly-defined relationships and relationships implied by social connections with other online users, where the relationships form a social graph 130.

In some examples, the social graph 130 can reflect a mapping of these users and how they are related. Furthermore, it should be understood that the social network server 101 and the social network software application 102 are representative of one social network and that there may be multiple social networks coupled to the network 105, each having its own server, application and social graph 130. For example, a first social network is more directed to business networking, a second more directed to or centered on academics, a third more directed to local business, a fourth directed to dating and others of general interest or a specific focus. In some embodiments, the social graph 130 is server hardware and a data repository for managing the data describing the social graphs of the users of various social networks including the social network represented by the social network server 101 and the social network software application 102. In other embodiments, the social graph 130 is included in and operable by the social network server 101 or is directly coupled to and accessible by the social network server 101 via a signal line (not shown).

The group messaging engine 103 is software including routines for exchanging messages between a group of users 125. In some embodiments, the group messaging engine 103 is operable on the social network server 101. In other embodiments, the group messaging engine 103 is operable on the client user device 115a. While FIG. 1 only illustrates the social network server 101 and user device 115a as including the group messaging engine 103, in practice, any of the depicted devices as well as other devices such as third-party servers could include the group messaging engine 103.

The user devices 115a, 115b . . . 115n are computing devices having data processing and data communication capabilities. In some embodiments, the user device 115 is a handheld wireless computing device which is capable of sending and receiving voice and data communications. For example, the user device 115 may include a processor, a memory, a power source and one or more network interfaces to broadcast and receive control data, voice data and/or network data via radio signals. The user device 115 may also include one or more of a graphics processor; a high-resolution touchscreen; a physical keyboard; forward and rear facing cameras; sensors such as accelerometers and/or gyroscopes; a GPS receiver; a Bluetooth module; memory storing applicable firmware; and various physical connection interfaces (e.g., USB, HDMI, headset jack, etc.); etc. Additionally, an operating system for managing the hardware and resources of the user device 115, application programming interfaces (APIs) for providing applications access to the hardware and resources, a user interface module for generating and displaying interfaces for user interaction and input, and applications such as applications for making phone calls, video calls, web browsing, messaging, social networking, gaming, capturing digital video and/or images, etc., may be stored and operable on the user device 115. In some embodiments, a user device 115 comprises a workstation computer, a desktop computer, a laptop computer, a netbook computer, a tablet computer, a smartphone, a set-top box/ unit, an Internet Protocol-connected smart TV including a computer processor capable of receiving viewer input, accessing video content on computer networks such as the Internet, and executing software routines to provide enhanced functionality and interactivity to viewers, or the like. In other embodiments, different user devices 115a, 115b . . . 115n comprise different types of computing devices. For example, the user device 115a is a smartphone, the user device 115b is a mobile phone of the non-smart phone variety and the user device 115n is a tablet computer. In some embodiments, the user device 115 is a client or terminal device. The user devices 115a, 115b . . . 115n in FIG. 1 are included by way of example. While FIG. 1 illustrates three or more user devices, the present disclosure applies to any system architecture having one or more user devices.

In some embodiments, the user device 115a is coupled to the mobile network 106 via signal lines 116 and 118 and coupled to the network 105 via signal line 114. The user 125a interacts with the user device 115a via signal line 120. In other embodiments, the user device 115b is coupled to the mobile network 106 via signal line 122 and the user 125b interacts with the user device 115b via signal line 124. In yet other embodiments, the user device 115n is coupled to the network 105 via signal line 126 and the user 125n interacts with the user device 115n via signal line 128.

In some embodiments, the user device 115a includes the group messaging application 107. The group messaging application 107 is software including routines for exchanging messages with other users via the group messaging engine 103. For example, the group messaging application 107 is operable to instruct the user device 115a to render user interfaces, receive user input, and send information to and receive information from the group messaging engine 103. In some embodiments, the group messaging application 107 is a set of instructions executable by the processor 335 (see FIG. 3A) to provide the functionality described herein. In other embodiments, the group messaging application 107 is stored in the memory 337 (see FIG. 3A) of the user device 115a and is accessible and executable by the processor 335 (see FIG. 3A) to provide the functionality described herein. In the foregoing embodiments, the group messaging application 107 may be adapted for cooperation and communication with the processor 335 (see FIG. 3A) and other components of the user device 115a via the bus 320 (see FIG. 3A). Additional structure and functionality of the group messaging application 107 is discussed below with reference to at least FIGS. 3A-9 below. While FIG. 1 only illustrates the user device 115a as including the group messaging application 107, in practice, any number of user devices 115 could include it.

The network 105 is a conventional type, wired or wireless, and may have any number of configurations such as a star configuration, token ring configuration or other known configurations. Furthermore, the network 105 may comprise a local area network (LAN), a wide area network (WAN) (e.g., the Internet), and/or any other interconnected data path across which multiple devices may communicate. In yet other embodiments, the network 105 may be a peer-to-peer network. The network 105 may also be coupled to or includes portions of the mobile network 106, or other telecommunications networks, for sending data using a variety of different communication protocols including short messaging service (SMS), multimedia messaging service (MMS), eXtended Messaging Service (XMS), hypertext transfer protocol (HTTP), secure hypertext transfer protocol (HTTPS), direct data connection, wireless access protocol (WAP), various email protocols, etc. In yet other embodiments, the network 105 includes Bluetooth communication networks for sending and receiving data.

A network data connection is a data link that couples a user device 115 to the network 105 for communication with the connection server 140, the social network server 101, and the other entities of the system 100 coupled to the network 105. A user device 115 may be coupled to the network 105 either directly or indirectly. In the depicted embodiment, the user devices 115a and 115n connect directly to the network 105 via signal lines 114 and 126, respectively. In this embodiment, the user devices 115a and 115n include a wireless network interface controller for sending and receiving data packets to an access point of the network 105. For example, the user devices 115a and 115n may be Wi-Fi enabled devices which connect to wireless local area networks (WLANs), such as wireless hotspots. In other embodiments, the user device 115a indirectly connects to the network 105 via a signal line 118, mobile network 106 and signal line 127. For example, the user device 115a connects to the network 105 via a wireless wide area network (WWAN) of the mobile network 106. In this embodiment, the mobile network 106 routes the network data packets sent and received by the user device 115a over the mobile network 106 and signal line 127. Signal lines 114 and 118 are depicted using dashed lines to illustrate that a network data connection established via these signal lines 114 and 118 can become unavailable.

The mobile network 106 is a cellular network including distributed radio networks and a hub. In some embodiments, the radio networks include groups of transceiver nodes (i.e., cell sites) which are distributed over a geographic area. Each group of transceiver nodes is controlled by a controller device (either within the radio network or hub of the mobile phone network). The transceiver nodes communicate wirelessly over radio channels with nearby user devices 115. The controller devices determine which of the transceiver nodes is best situated to receive and send data to a nearby user device 115 and controls handovers from transceiver node to transceiver node as the user device 115 moves in and out of range. The mobile network 106 and user devices 115 may use a multiplexing protocol or a combination of multiplexing protocols to communicate including frequency division multiple access (FDMA), time-division multiple access (TDMA), code division multiple access (CDMA), space division multiple access (SDMA), wavelength division multiple access (WDMA) and random access protocols, or any derivative protocols such as orthogonal frequency division multiple access (OFDMA), orthogonal frequency-hopping multiple access (OFHMA), etc. The mobile network 106 and user devices 115 may also employ multiple-input and output (MIMO) channels to increase the data throughput over the signal lines coupling the mobile network 106 and user devices 115. The mobile network 106 may be any generation mobile phone network. In a first embodiment, the mobile network 106 is a 2G or 2.5G Global System for Mobile Communications (GSM), IS-95, etc., network. In a second embodiment, the mobile network 106 is a 3G (Universal Mobile Telecommunications System) UTMS, IS-2000, etc., network. In a third embodiment, the mobile network 106 is a 4G Evolved High-Speed Packet Access (HSPA+), 3GPP Long Term Evolution (LTE), Worldwide Interoperability for Microwave Access (WiMax™), etc., network. In other embodiments, the mobile network 106 may be any known mobile network type or may be a backwards-compatible multi-generational network that supports two or more technology standards.

The mobile network 106 may provide a messaging service, such as a text messaging service, for exchanging messages between user devices 115 using a compatible messaging protocol. In some embodiments, the mobile network 106 may include switching elements and message gateways to provide the messaging service. These switching elements and message gateways relay the text messages between two or more endpoints of the mobile network, such as the user devices 115 and other entities coupled to the mobile network 106 either directly or indirectly. The messaging service may be an SMS, MMS, XMS, instant messaging service, or the like, which uses a corresponding communication protocol. In addition to its conventional meaning, the term text message is not limited to including text and may include any other data types or combination of data types including text, graphics, audio, video, etc. In some embodiments, the messaging service of the mobile network 106 serves as a fallback messaging service, which is described in further detail below.

A channel is of a pair of distinct radio frequency signals, i.e., a sending signal and a receiving signal, which couples a user device 115 to the mobile network 106. For example, a control channel is channel over which SMS data, identification data, and setup data is transmitted, a voice channel is a channel over which voice data is transmitted during a voice call, and a network data channel is a channel over which network data packets are transmitted, which may include both voice data packets and application data packets. In some embodiments, signal lines 116 and 118 comprise one or more channels for sending and receiving data between a user device 115a and a transmission node of the mobile network 106. In a 2G or 3G mobile network, for example, signal line 116 may comprise a control channel and voice channel, and signal line 118 may comprise a data channel. The user device 115 and a transmission node of the mobile network 106 communicate control data back and forth over the control channel to setup a voice call or a data packet transmission. Based in part on this control data, a controller device of the mobile network 106, such as a transmission node controller or a radio network controller, determines an appropriate voice channel for the voice call and assigns the voice call to the voice channel, or determines an available data channel 118 for sending and receiving network data packets for an application operating on the user device 115. In this example, the data channel 118 is a channel comprising a pair of radio frequency signals distinct from those of the voice and control channels 116. In another example including some 4G and later mobile phone networks, signal line 116 constitutes the control channel and signal line 118 constitutes the data channel, thus omitting the voice channel. The data channel is used to transmit both voice data and application data as network data packets, such as Internet Protocol (IP) data packets. In this other example, the core network of the mobile network 106 includes a packet-switching devices that route the data packets received from the user device 115 based on information included in a header of the data packets.

A fallback messaging service is a messaging service other than the group messaging service provided by the social network server 101 for exchanging messages between the user devices 115. The fallback messaging service may be operated by one or more computing devices including one or more processors and one or more storage devices storing data or instructions for execution by the one or more processors. For example, the fallback messaging service may be operated by server hardware, a server array or any other computing device, or group of networked computing devices, having data processing, storing and communication capabilities. In some embodiments, the one or more computing devices operating the fallback messaging service are referred to herein as a fallback messaging server.

In some embodiments, the fallback messaging service is a messaging service provided by the mobile network 106, such as an SMS, MMS, XMS, etc. The messaging service provided by the mobile network 106 may, in various implementations, be provided in combination with the SMS functionality of the SMS gateway 140. In other embodiments, the fallback messaging service is a telecommunications service provided by the telecommunications server 155, for example one which emulates exchanging messages via SMS or MMS but provides the benefit to the user 125 of not having to incur the carrier charges associated with the sending/receiving messages using the SMS or MMS of the mobile network 106. In yet other embodiments, the fallback messaging service is an email service operated by the email server 160. However, these examples are not exhaustive and other fallback messaging services, for example, provided by an instant messaging (IM) server (not shown) coupled to the network 105 and/or the mobile network 106 are within the scope of the present disclosure. A fallback messaging protocol is a communication protocol used by the fallback messaging server/service for sending and receiving the message data and includes any standard messaging protocols such as SMS, MMS, XMS, WAP, Simple Mail Transfer Protocol (SMTP), Extensible Messaging and Presence Protocol (XMPP), Session Initial Protocol (SIP), Internet Relay Chat (IRC) protocol, HTTP, HTTPS, etc.

The user devices 115 may access the fallback messaging service via the network data connection or a fallback data connection. The fallback data connection is a data link that couples a user device 115 to other user devices 115 via at least the mobile network 106. In some embodiments, the fallback data connection advantageously serves as an alternative data link to the network data connection for connecting the user device 115 to the fallback messaging server. In some embodiments, the control channel 116 coupling a user device 115 to the mobile network 106 serves as segment of the fallback data connection. In other embodiments, a dedicated messaging channel coupling the user device 115 to the mobile network 106 serves as a segment of the fallback data connection. In these or other embodiments, the mobile network 106 and signal lines and/or the network 105 coupling the mobile network 106 to the fallback messaging server also constitute segments of the fallback data connection. For example, the fallback data connection connects a user device 115 to the fallback messaging server (e.g., an SMS gateway of the mobile network) via signal line 116 and the mobile network 106. In another example, the fallback data connection connects a user device 115 to the fallback messaging server (e.g., the SMS gateway 150) via signal line 116, the mobile network 106, and signal line 131 or signal lines 127 and 117. While the above examples are provided, it should be understood that the fallback data connection can be any data link that serves as an alternative data link to the network data connection.

The following are additional non-limiting examples of embodiments of the fallback data connection. A user device 115a is coupled to a node of the mobile network 106 via the control channel 116 and the data channel 118. The control channel 116 links to an SMS switching element (not shown) of the mobile network 106 and represents a segment of the fallback data connection. The data channel 118 links to a WWAN of the mobile network 106 which is interconnected with the network 105 and represents a segment of the network data connection. Heavy traffic by other user devices 115 also connected to this node of the mobile network 106 overwhelm the node with data traffic and the user device 115a is unable to connect to the network 105 via the WWAN. As a result, the user device 115a is unable to connect and transmit message data to the social network server 101 via the network data connection. The user device 115a identifies that the network data connection is unavailable and transmits the message data as an SMS message to the user device 115a via the fallback data connection using the control channel 116, which is still able to transmit data to and from the user device 115a despite the heavy data traffic being experience by the node. In another example, a user device 115a is located in a remote geographic location of the mobile network 106 where cellular reception is poor and the user device 115a is only able to acquire a signal with a node of the mobile network 106 via the control channel 116, which represents a segment of the fallback data connection. Similar to the above example, the user device 115a identifies that a network data connection to the social network server 101 is unavailable and transmits the message data as an SMS message to the user device 115a via the fallback data connection using the control channel 116.

The search server 135 is communicatively coupled to the network 105 via signal line 112. In some embodiments, the search server 135 includes a search engine 143 for retrieving results that match search terms from the Internet. Although, only one search server 135 is shown, it should be understood that multiple search servers 135 may be present.

The connection server 140 is a server for generating and providing connection information for user devices 115. In the depicted embodiment, the connection server 140 is coupled to the network 105 via signal line 111. In some embodiments, the connection server 140 is a hardware server including a processor, memory and network communication capabilities. In other embodiments, the connection server 140 is a virtual server. In some embodiments, user devices 115 establish and maintain data connections to the connection server 140 via the network 105 whenever the user devices 115 are coupled to the network 105 via a network data connection and can send and receive network data. Upon request, the connection server 140 generates connection information for one or more user devices 115 and sends the connection information to the device requesting the information. For example, the connection server 140 tests whether a user device 115 is connected to the connection server 140, generates connection information including a verification signal describing the results of the connection test, and sends the connection information to the device requesting it. In some embodiments, when a user device 115 establishes a network data connection to the network 105, the user device 115 logs into the connection server 140 using a unique identifier associated with the group messaging engine 103, such as a user identifier for the social network software application 102. For example, the persistence module 308 of the group messaging application 107 sends a connection request to the connection server 140 as described in further detail below with reference to at least FIG. 3B. Accordingly, provided user authorization is given, the connection server 140 is aware of the user identifiers that are logged into the connection server 140 and can provide confirmation of such to the group messaging engine 103 of the social network server 101 and the other components of the system 100. In these or other embodiments, the connection server 140 or the user device 115 may test whether an open data connection exists between the connection server 140 and the user device 115 via a network data connection by sending a verification request, such as an Internet control message protocol (ICMP) echo request, to the other. If the connection is active, a confirmation signal is returned by the user device 115 or the connection server 140 receiving the echo request, such as an echo reply (i.e., ping), via a network data connection and the network 105. If the connection is no longer active, no response is received and the verification request times-out.

While FIG. 1 depicts the connection server 140 as a stand-alone entity, the connection server 140 may be included in the other elements of the system 100 including the social network server 101. Additionally, while only one connection server 140 is depicted, the system 100 may include any number of connection servers 140. For example, connection servers 140 may distributed by geographic region to facilitate a quicker and more efficient connection to the connection servers 140 by the user devices 115 located in those regions. In another example, if a particular connection server 140 is overloaded with traffic, a user device 115 may connect to other less utilized connection servers 140.

The notification server 145 is a server for providing notifications to one or more user devices 115. In the depicted embodiment, the notification server 145 is coupled to the network 105 via signal line 113. In some embodiments, the notification server 145 is a hardware server including a processor, memory and network communication capabilities. In other embodiments, the notification server 145 is a virtual server. The notification server 145 may include a push notification service (PNS), which is software including routines executable by a processor (not shown) of the notification server 145 to instruct the notification server 145 to forward push notifications to one or more user devices 115 via the network 105. The push notifications are received by the notification server 145 from the social network server 101, other entities of the system 100 or other third party servers (not shown), and are forwarded to the one or more user devices 115 via the network 105. Some examples of push notifications include custom text notifications, badges indicating the number of notifications that await review, and sounds.

In some embodiments, use of push notifications is unnecessary because the group messaging application 107 can be initialized and an interface can be displayed to the user 125a upon receipt of a signal from the group messaging engine 103. In other embodiments where a user device 115a is limited to receiving push notifications for any applications that are not active or whose interfaces are not actively being displayed to the user 125a, push notifications received by the user device 115a from the notification server 145 are displayed to the user 125a to inform the user of any new group messaging activity that has occurred. While FIG. 1 depicts the notification server 145 as a stand-alone entity, the notification server 145 may be included in the other elements of the system 100 including the social network server 101. Additionally, while only one notification server 145 is depicted, more than one notification server 145 may be included in the system 100.

The SMS gateway 150 is a server for sending and receiving message data via text message (e.g. SMS, MMS, etc.). In the depicted embodiment, the SMS gateway 150 is coupled to the network 105 via signal line 117. The SMS gateway 150 may also be directly coupled to the social network server 101 via signal line 104 for direct communication between those entities. In some embodiments, the SMS gateway 150 is a hardware server including a processor, memory and network communication capabilities. In other embodiments the SMS gateway 150 is a virtual server.

While FIG. 1 depicts the SMS gateway 150 as a stand-alone entity, the SMS gateway 150 may be included in the other elements of the system 100 including the social network server 101. In some embodiments, the SMS gateway 150 is a direct to mobile gateway which connects directly to the mobile network 106 via signal line 131 and communicates with the user devices 115 operating on a mobile network 106. In other embodiments, the SMS gateway 150 is an aggregator or SS7-type mobile gateway, which interfaces with a mobile network 106 via the network 105. In these other embodiments, the SMS gateway 150 is coupled to the network 105 via signal line 117; communicates with the mobile network 106 via signal lines 117 and 127; and sends and receives text messages using a gateway element (e.g., SMSC) of the mobile network 106.

In some embodiments, the SMS gateway 150 receives text messages from the social network server 101 and relays the text messages to the designated recipient user devices 115 using a corresponding text messaging protocol. For example, the SMS gateway 150 converts message data received from the social network server 101 to a text message format (e.g., SMS) and dispatches the text message using a text messaging protocol (e.g., SMS) to the recipient or recipients indicated in the message data. In another example, the message data received by the SMS gateway 150 is pre-formatted in a text message format (e.g., SMS) and the SMS gateway 150 relays the message data to the recipient or recipients identified in a header of the message data. In other embodiments, the SMS gateway 150 receives a text message from a user device 115 via the fallback data connection and relays the text message to the group messaging engine 103 of the social network server 101. The SMS gateway 150 may relay the text message to the group messaging engine 103 in the same format in which it was received by the SMS gateway 150 or the SMS gateway 150 may convert the text message to another format compatible with the group messaging engine 103 and then relay the converted message to the group messaging engine 103.

In some embodiments, the SMS gateway 150 operates as a fallback messaging server and the data link by which the SMS gateway 150 receives and relays text messages advantageously serves as a fallback data connection should a user device 115 be unable to establish a network data connection to the network 105 and connect to the connection server 140. For example, as previously described, the signal lines 116 and 122 may include control channels which couple the user devices 115a and 115b to transmission nodes of the mobile network 106. Responsive to receiving the message data in the form of a text message, switching elements of the mobile network 106 relay the text message to and from the SMS Gateway 150 either directly via signal line 131 or indirectly via signal lines 127 and 117, and the network 105. As a result, the text message (e.g., the SMS message) can be advantageously delivered to the user device 115a or generated by and sent from a user device 115a using the social network server 101 via the SMS gateway 150 even if the user device 115a is unable to establish a network data connection to connect to the connection server 140 (e.g., the user device 115a is unable to connect to the network 105 via a WWAN of the mobile network 106 over signal line 118 or a WLAN of the network 105 over signal line 114).

In some embodiments, the telecommunications server 155 is a messaging server for receiving messages via the network 105 and relaying the messages as text messages using the messaging service of the mobile network 106. The telecommunications server 155 may also receive text messages via the messaging service of the mobile network 106 and relay them via the network 105. For example, a user device 115 coupled to the network 105 via a network data connection may send a message to a recipient user device 115 coupled to the mobile network 106 via a fallback data connection by sending the message to the telecommunications server 155 over the network data connection. The telecommunications server 155 may then relay the message using the messaging service (e.g., SMS) of the mobile network 106 to the recipient user device 115 via the fallback data connection. In some embodiments, functionality of the telecommunications server 155 is accessed by the user device 115 using an alternative telecommunications module 333, as discussed in further detail below.

The email server 160 is a messaging server for sending, receiving and providing access to electronic mail (email). In some embodiments, the email server 160 is a hardware server including a processor, memory and network communication capabilities, and is coupled to the network 105 via signal line 136. In other embodiments, the email server 160 is a virtual server. The email server 160 includes email server software operable for sending, storing, receiving and providing access to email. The email server 160 includes server software operable to transmit email between any of the constituent elements of the system 100. For example, the email server 160 receives, stores and relays emails sent by a user device 115 to one or more other elements of the system 100, such as user devices 115, the social network server 101, etc. In some embodiments, email is transmitted by the email server 160 and other elements of the system 100 over the network 105 using protocols such as SMTP, IMAP, POP, Webdav, etc. While only one email server 160 is depicted, any number of email servers 160 could be included in the system 100. In some embodiments, the email service operated by the email server 160 serves as a fallback messaging service.

Social Network Server 101

Figure 2:
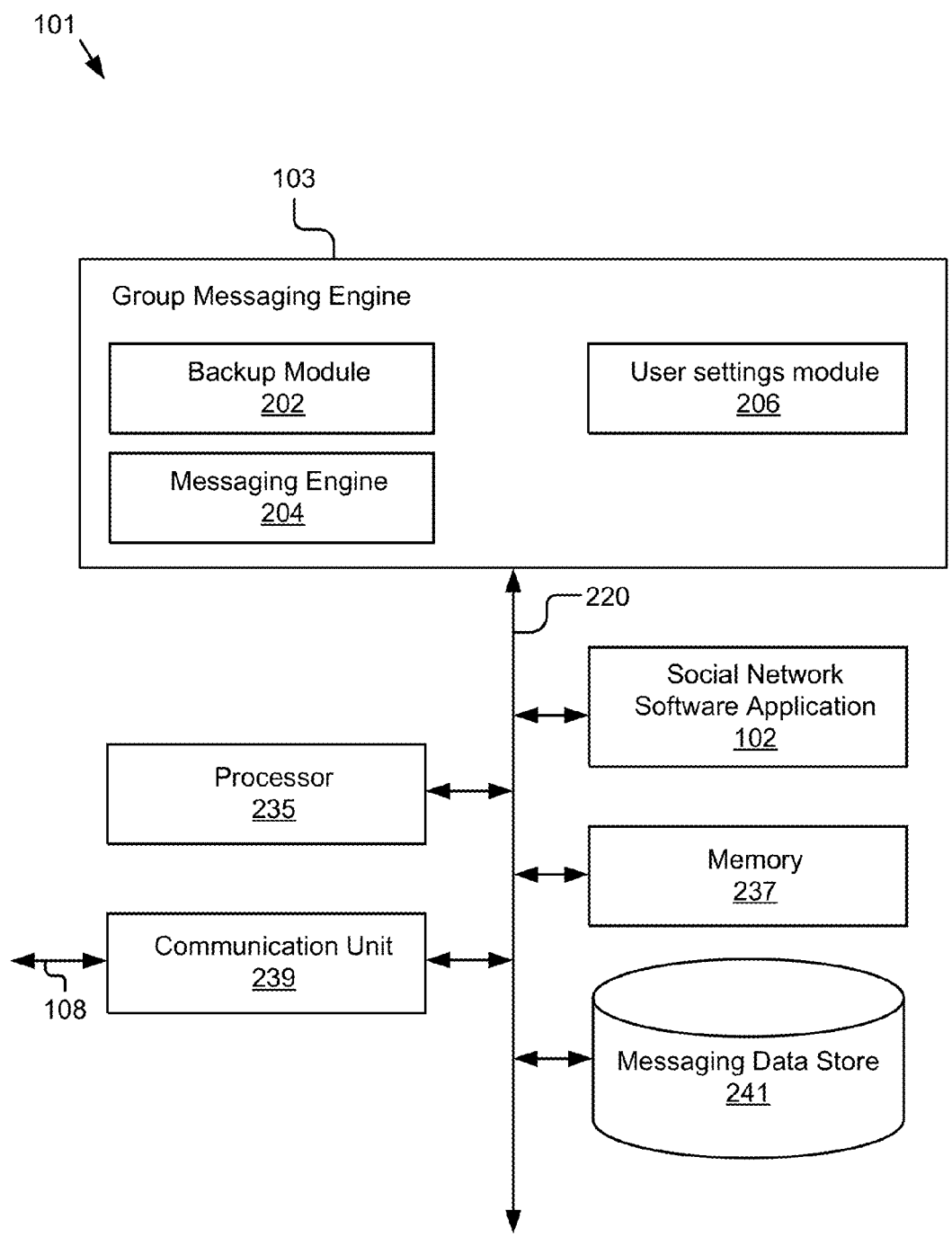
FIG. 2 is a block diagram illustrating a social network server according to some embodiments of the present disclosure.

FIG. 2 is a block diagram of illustrating a social network server 101 according to some embodiments of the present disclosure. In the depicted embodiment, the social network server 101 is a computing device comprising a social network software application 102, a group messaging engine 103, a processor 235, a memory 237, a communication unit 239 and a messaging data store 241. The components 102, 103, 235, 237, 239 and 241 are communicatively coupled via a communication bus 220. The bus 220 can be any type of conventional communication bus for transferring data between components of a computer, or between computers.

The processor 235 comprises an arithmetic logic unit, a microprocessor, a general purpose controller or some other processor array to perform computations and provide electronic display signals to a display device (not shown). The processor 235 is coupled to the bus 220 for communication with the other components of the social network server 101. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability might be limited to supporting the display of images and the capture and transmission of images. The processing capability might be enough to perform more complex tasks, including various types of feature extraction and sampling. It should be understood that other processors, operating systems, sensors, displays and physical configurations are possible.

The memory 237 stores instructions and/or data that may be executed by processor 235. The memory 237 is coupled to the bus 220 for communication with the other components of social network server 101. The instructions and/or data may comprise code for performing any and/or all of the techniques described herein. The memory 237 may be a dynamic random access memory (DRAM) device, a static random access memory (SRAM) device, flash memory or some other known memory device. In some embodiments, the memory 237 also includes a non-volatile memory or similar permanent storage device and media including, for example, a hard disk drive, a floppy disk drive, a CD-ROM device, a DVD-ROM device, a DVD-RAM device, a DVD-RW device, a flash memory device or some other mass storage device known for storing information on a more permanent basis. For clarity, instructions and/or data stored by the memory 237 or 337 (see FIG. 3A) are described herein as different functional components, such as "modules" or "engines," where different modules or engines are different instructions and/or data stored in the memory 237 or 337 (see FIG. 3A) that cause the described functionality when executed by the processor 235 or 335 (see FIG. 3A).

The communication unit 239 is coupled to the network 105 by the signal line 108 and coupled to the bus 220. In some embodiments, the communication unit 239 is a network interface device (I/F) which includes ports for wired connectivity. For example, the communication unit 239 includes a CAT-5 interface, USB interface, or SD interface, etc. In other embodiments, the communication unit 239 includes a transceiver for sending and receiving signals using Wi-Fi, Bluetooth® or cellular communications for wireless communication. The communication unit 239 links the processor 235 to the network 105 that may in turn be coupled to other processing systems. The communication unit 239 may communicate with the other entities of the system 100 using standard communication protocols including, for example, TCP/IP, HTTP, HTTPS, SMTP, SMS, MMS, XMPP, SIP, IRC, etc. In some embodiments, the communication unit 239 may provide other connections to the network 105 and the other entities of the system 100, for example to the SMS gateway 150 via signal line 104.

Group Messaging Engine 103

The group messaging engine 103 is software including routines for exchanging messages between a group of users 125. In some embodiments, the group messaging engine 103 is a set of instructions executable by the processor 235 to provide the functionality for exchanging messages between a group of users 125. In other embodiments, the group messaging engine 103 is stored in the memory 237 of the social network server 101 and is accessible and executable by the processor 235 to provide this functionality. In the foregoing embodiments, the group messaging engine 103 may be adapted for cooperation and communication with the processor 235 and the other components of the social network server 101 via the bus 220. The messages exchanged by the group messaging engine 103 under a default implementation, are exchanged using a native messaging protocol. In some embodiments, the native messaging protocol is an instant messaging protocol suitable for communication across an IP network (e.g., the Internet). For example, the native messaging protocol is XMPP, SIP, IRC, HTTP, etc.

In the depicted embodiment, the group messaging engine 103 includes a backup module 202, a messaging engine 204 and a user settings module 206. The components 202, 204 and 206 of the group messaging engine 103, and the group messaging engine 103 itself, are communicatively coupled to the bus 220 for communication with each other and the other components 102, 235, 237, 239 and 241 of the social network server 101. The group messaging engine 103 may interact and communicate with the social network software application 102 via the bus 220. For example, the group messaging engine 103 can interact with a credentials module (not shown) of the social network software application 102 to authenticate users 125 seeking access to the group messaging engine 103, and to provide the group messaging engine 103 access to information and functionality of the social network software application 102 and the social graph 130. In other embodiments, the group messaging engine 103 is stored and operable on a third-party server (not shown) which is coupled by the network 105 for communication and interaction with the social network server 101, the social network software application 102 and the social graph 130. In these or other embodiments, the group messaging engine 103 may access information and utilize the functionality of the social network software application 102 and the social graph 130 via an API.

The backup module 202 is software including routines for receiving, promoting and storing messages received from a user device 115. In some embodiments, the backup module 202 is a set of instructions executable by the processor 235 to provide this functionality. In other embodiments, the backup module 202 is stored in the memory 237 of the social network server 101 and is accessible and executable by the processor 235 to provide this functionality. In any of these embodiments, the backup module 202 may be adapted for cooperation and communication with the processor 235 and other components of the social network server 101 via the bus 220.

The backup module 202 may be coupled to the communication unit 239 via the bus 220 to send and receive message-related data. In some embodiments, the backup module 202 may receive a backup request from a user device 115 to backup one or more messages that are unassociated with the group messaging engine 103, such as messages exchanged via a fallback messaging service (e.g., SMS) from the user device 115. Message data describing the one or more text messages may be included with or accompany the backup request. In some embodiments, the message data may include message thread information describing how the one or more message are connected to one another or to other messages stored in the messaging data store 241. In other embodiments, the backup module 202 may derive message thread information from metadata included in the one or more messages. In some embodiments, the message data may be received in a format compatible with the fallback messaging service (e.g., SMS compatible format) or may converted to a native format by the group messaging application 107 before being sent to the backup module 202. In some embodiments, the backup request may be initiated by a user 125 desiring to backup text messages (e.g., SMS messages) stored in the memory 337 of the user device 115, or may be initiated automatically by the group messaging application 107 operating on a user device 115 to store messages previously sent via a fallback messaging service, such as the SMS of the mobile network 106. For example, upon reestablishing a network data connection, the group messaging application 107 may send a backup request to backup fallback messages sent while the network data connection was unavailable for exchanging messages natively via the group messaging engine 103.

In some embodiments, the messages backed up via the backup module 202 are promoted for use and integration with the group messaging engine 103. Promoting a message may include integrating the message with other messages already associated with the group messaging engine 103. The integration may include integrating message thread information describing how the message being integrated is related to other messages. In some embodiments, during the promotion, the message is converted from a non-native format to a format that is native to the group messaging engine. To preserve the origins of the one or more messages described by the message data, the backup module 202 may annotate the message data with information identifying the fallback messaging service it was originally exchanged by. Promotion by the backup module 202 is advantageous because, in some embodiments, it allows messages exchanged by a user 125 using a fallback messaging service 103 which have different formatting and protocol requirements than those of the group messaging engine 103 and/or the group messaging application 107 to be seamlessly integrated and managed by the group messaging engine 103.

The backup module 202 may be coupled to the messaging data store 241 to store, manipulate and retrieve message-related information. In some embodiments, the backup module 202 stores the backup request and associated message data in the messaging data store 241. The message data may be stored in the messaging data store 241 with information associating it with a user account of the user 125. The backup module 202 may store the backup request and/or message data as it was received, may store the message data after it has been converted/promoted to a format compatible with/native to the group messaging engine 103, or both. By way of example, the backup request may be a request to backup all of the text messages (e.g., SMS, MMS, etc.) stored on the user device 115 of the user 125 and may include message data describing the text messages and the text message threads with which the text messages are associated. The backup module 202 may convert the text messages and message threads to a native format and store them in the messaging data store 241 with account information identifying the messages and message threads as belonging to the user 125.

In some embodiments, the backup module 202 may receive a restore request from a user device 115 to restore one or more messages to a user device 115. The restore request may request all messages associated with a user account of the user 125 be provided or that select messages be provided. Message thread data describing how the messages are interrelated, i.e., threaded together may also be provided. In response to receiving the restore request, the backup module 202 may interact with the messaging data store 241 to retrieve the requested messages. In some embodiments, the messages retrieved in response to the restore request includes messages stored by the messaging engine 204 during operation as discussed in further detail below. The messages being provided by the backup module 202 may be provided in a format native to the group messaging engine 103 and/or the group messaging application 107, in the format the messages were originally received in by the group messaging engine 103, or both.

As a non-limiting example of a restore request, a user 125 may acquire a new user device 115 that lacks any record of messages the user 125 had previously exchanged via various messaging services including SMS, MMS, the group messaging service provided by the group messaging engine 103, etc. Using the group messaging application 107, the user 125 may send a restore request to the group messaging engine 103 requesting all messages be restored on the user device, and in response, the backup module 202 may retrieve and send all messages and message thread information stored in the messaging data store 241 to the user device 115 of the user 125 for presentation to the user 125. Thus, one of the many advantages of the backup module 202 includes providing a user 125 a mechanism for reliably and conveniently archiving and restoring his or her SMS messages, MMS messages, messages native to the group messaging engine 103, and the like, even if the user device 115 is lost, stolen or otherwise replaced.

Requests received by the backup module 202, such as a backup request or a restore request, may include or may otherwise be accompanied by authorization information associated with the user 125 to establish that the user 125 is authorized to store/retrieve messages stored in the messaging data store 241. The backup module 202 may determine whether the user 125 is authorized to backup the message data based at least in part on the authorization information. For example, the backup module 202 may be coupled to the credentials module of the social network software application 102 to send the authorization information and receive verification of whether the user 125 is authorized to access the group messaging engine 103.

The messaging engine 204 is software including routines for determining the availability of a network data connection and exchanging messages based at least in part on the availability of the network data connection. In some embodiments, the messaging engine 204 is a set of instructions executable by the processor 235 to provide this functionality. In other embodiments, the messaging engine 204 is stored in the memory 237 of the social network server 101 and is accessible and executable by the processor 235 to provide this functionality. In any of these embodiments, the messaging engine 204 may be adapted for cooperation and communication with the processor 235 and other components of the social network server 101 via the bus 220.

The messaging engine 204 may be coupled to the communication unit 239 to receive message data sent by a user device 115 and parse it for sender and recipient information. The sender information may include identifying information for a user 125 or user device 115 that sent the message data. For example, the sender information may include one or more of a sender's user identifier associated with a social network software/application 102 user account, a network address of the sender's user device 115 (e.g., an IP address, port, etc.), a mobile phone number for the sender's user device 115, information about the computing environment of the user device 115 (e.g., operating system type and version and group messaging application 107 type and version), etc. The recipient information may also include identifying information for each user device 115 designated to receive the message data. For example, the recipient information may include one or more of a recipient's user identifier associated with the recipient's user account for the social network software/application 102, a network address of the recipient's user device 115, a mobile phone number for the recipient's user device 115, etc. In some embodiments, the messaging engine 204 is coupled to the messaging data store 241 to store a copy of the message data. The messaging engine 204 may store a copy of the message data in the messaging data store 241 in the format that it was dispatched in, in the format that it was received in by the communication unit 239, or both.

In some embodiments, the messaging engine 204 is coupled to the connection server 140 via the network 105 to send a connection query and receive connection information. The connection query generated and sent by the messaging engine 204 may include a list of recipient identifiers from the recipient information. Using the list of identifiers, the connection server 140 may determine whether user devices 115 identified by the identifiers are connected to the connection server 140, and generate and send connection information to the messaging engine 204 describing whether or not each of the user devices 115 is coupled to the connection server 140 via a network data connection. In some embodiments, the messaging engine 204 analyzes the connection information, assigns a fallback identifier to the fallback recipients (i.e., each recipient/user 125 designated to receive the message via the fallback messaging protocol), maps the message data to the group of users exchanging messages using the fallback identifier, and stores mapping data describing the fallback identifier, the group of users exchanging messages, etc., in the messaging data store 241 for later reference and revision. In some embodiments, the fallback identifier is a phone number drawn from a pool of phone numbers which identify the SMS gateway 150 as a telecommunications endpoint on the mobile network 106. In other embodiments, the fallback identifier is an email address drawn from a pool of email addresses assigned to the group messaging engine 103. In these or other embodiments, the fallback identifier is assigned to one messaging group at a time to avoid conflicts with other messaging groups. Additional structure and functionality of the connection server 140 are described above with reference to FIG. 1, for example.

In some embodiments where the connection information describes a recipient user device 115 as being coupled to the network 105 via the network data connection and connected to the connection server 140, the messaging engine 204 dispatches the message via the network data connection using the native messaging protocol. In other embodiments where a recipient's user device 115 is described by the connection information as not being connected to the connection server 140, the messaging engine 204 may be coupled to the fallback messaging server (e.g., the SMS gateway, the email server 160, an IM server, etc.) and advantageously relay the message data to the fallback messaging server for dispatch to a user device 115 of each of the fallback recipients via the fallback data connection. This provides a recipient operating the recipient user device 115 the benefit of still being able to receive the message, even though the recipient user device 115 is not connected to the connection server 140 via a network data connection (e.g., an Internet connection). The messaging engine 204 may also optionally convert the message data prior to dispatching the message data. In some embodiments, the messaging engine 204 converts the message data to a format compatible with the protocol being used to send the message data. For example, the messaging engine 204 converts the message data to a format compatible with the fallback messaging protocol for the fallback recipients, and converts the message data to a format compatible with the native messaging protocol for the recipients designated to receive the message via the native messaging protocol.

By way of illustration, the messaging engine 204 may convert the message data into a text message format, annotate the sender and recipient information to describe the fallback sender and recipient information (i.e., phone numbers) that it mapped, and relay the formatted message data to the SMS gateway 150. In response, the SMS gateway 150, using a text messaging protocol, transmits the formatted text message to a user device 115 of each of the fallback recipients via the fallback data connection over the mobile network 106. In another example, the fallback messaging protocol is an email protocol, the messaging engine 204 converts, annotates and dispatches the message data to the email server 160 and the email server 160 delivers the emails to the fallback recipients via the fallback data connection. In yet another example, the fallback messaging protocol is an IM protocol and the messaging engine 204 converts the message data, addresses it and dispatches it using the IM protocol via the fallback data connection or relays the message data to an IM server (not shown) for dispatch via the fallback data connection.

The fallback messaging protocol may require that the fallback recipients be identified with an identifier associated with the fallback messaging protocol, such as a mobile phone number or an email address. In some embodiments, the identifying information associated with the native messaging protocol may be the same as the identifying information associated with the fallback messaging protocol. For example, a user may use the same email address for sending and receiving email as a user identifier for accessing the group messaging application 103. However, in other embodiments, the identifiers may differ. In these other embodiments, the messaging engine 204 is capable of retrieving the alternative identifying information associated with the fallback messaging protocol. For example, the messaging engine 204 may query the social graph 130 or a user account associated with the social network software/application 102 for the alternative identifying information. In another example, alternative identifying information is included in the message data and the messaging engine 204 parses the alternative identifying information from the message data. While the messaging engine 204 is described as being capable of retrieving the alternative identifying information, in other embodiments, other components of the group messaging server 103 or social network server 101 may provide this functionality.

In some embodiments, the messaging engine 204 associates a message thread of the group of users 125 exchanging messages (i.e., the messaging group) with a unique session identifier. The unique session identifier may identify a message thread associated with the message data being exchanged. For example, once an initial message is sent by a user 125 to one or more other users 125 via the group messaging engine 103, a message thread is formed. The message thread is added to when subsequent messages are exchanged between the users 125 in response to the initial message. The messages are identified as belonging to the same message thread by the unique session identifier. In some embodiments, the messages dispatched and received via the fallback messaging protocol are associated with the message thread by the messaging engine 204 mapping the fallback identifier assigned to the fallback recipients to the unique session identifier associated with the message thread.

In some embodiments, the message data received by the messaging engine 204 represents a reply message sent in response to a previous message dispatched by the messaging engine 204 via the fallback data connection. The messaging engine 204 can determine whether the reply message was sent via the fallback data connection in various ways. In some embodiments, the messaging engine 204 determines the reply message as having been sent via the fallback data connection by providing the sender information from the reply message to the messaging engine 204, and the messaging engine 204 indicating that the sender information includes a fallback identifier. In other embodiments, the messaging engine 204 determines the message data as having been sent via the messaging engine 204 from a communications port and/or IP address via which the reply message data was received, the protocol used to send the reply message data, etc. In some embodiments where the reply message data was sent via the fallback data connection, the messaging engine 204 uses the sender information provided by the fallback determination module 204 to query the messaging data store 241 for stored mapping data. For example, the messaging engine 204 queries the messaging data store 241 using a fallback identifier included in the sender information to determine the messaging group, and in particular, the recipients from the messaging group that the reply message should be dispatched to. The messaging engine 204 may use this information as recipient information for dispatching the message data. By way of example, the group messaging engine 103 determines that a network data connection to a user device 115 is unavailable so message data is dispatched to the user device 115 in the form of an SMS message via the fallback data connection. In response, reply SMS message data is received from the user device 115 via the fallback data connection. The messaging engine 204, using the sender's phone number (i.e., the fallback identifier), queries the messaging data store 241 for mapping data that maps the fallback identifier to the other member(s) of the messaging group, which in this example is the user who sent the initial message data. The messaging engine 204 uses the mapping data to determine if a network data connection exists for the user who sent the initial message data, and dispatches the reply message data accordingly.

The user settings module 206 is software including routines for determining, storing and retrieving user settings. In some embodiments, the user settings module 206 is a set of instructions executable by the processor 235 to provide this functionality. In other embodiments, the user settings module 206 is stored in the memory 237 of the social network server 101 and is accessible and executable by the processor 235 to provide this functionality. In the foregoing embodiments, the user settings module 206 may be adapted for cooperation and communication with the processor 235 and other components of the social network server 101 via the bus 220. In some embodiments, the user settings module 206 is coupled to the communication unit 239 to receive the request signals.

The user settings module 206 may receive user settings data from other entities of the system 100, such as the user devices 115, and store the user settings data in the messaging data store 241. The user settings data may instruct the group messaging engine 103 on how to function in various scenarios. For example, a user 125 can provide, via a group messaging application 107, user settings data to instruct the group messaging engine 103 to default to sending messages via a specific fallback messaging service and/or may define the order in which fallback messaging services should be selected by the group messaging application 107 and/or group messaging engine 103. The user settings data may also instruct the group messaging engine 103 to use a particular fallback messaging service for a period of time or until updated settings data are provided; to delay dispatch via a fallback messaging service until a predetermined amount of time has passed; to opt out of receiving messages via a fallback messaging service, to exempt certain recipients from receiving messages via a fallback messaging service; and to determine the which services to use as the fallback (e.g., SMS, MMS, email, etc.), etc. However, the foregoing examples are not exhaustive of the types of user settings data that can be provided, and it should be understood that any functionality of the messaging engine 204 can be regulated by user settings data provided by a user 125.

Messaging Data Store 241

The messaging data store 241 is data storage for storing messaging-related data. The messaging data store 241 is coupled for communication with the components 202, 204 and 206 of the group messaging engine 103 and the other components 102, 235, 237 and 239 of the social network server 101 via the bus 220. In some embodiments, the messaging data store 210 stores information received, generated and sent by the other modules of the group messaging engine 103. For example, the messaging data store 241 stores requests, message data, user settings data, conversion data, mapping data, etc. In some embodiments, the messaging data store 241 may store an archive of a user 125's messages including text messages, group messages, instant messages, emails, etc. For example, as previously described above with reference to the backup module 202, a user 125 can backup all messages stored in the user 125's user device 115 to the messaging data store 241 for later retrieval (e.g., should the messages be deleted from the user device 115). In some embodiments, the messaging data store 241 is coupled to the other modules of the group messaging engine 103 so these modules can manipulate, i.e., store, query, update and/or delete data using programmatic operations.

In some embodiments, the messaging data store 241 includes a database management system (DBMS) operable on the social network server 101 and storable in the memory 237. For example, the DBMS could be a structured query language (SQL) DBMS. In these embodiments, the social network server 101, and in particular, the group messaging engine 103 are coupled to the DBMS via the bus 220 to store data in multi-dimensional tables comprised of rows and columns, and manipulate, i.e., insert, query, update and/or delete, rows of data using programmatic operations (e.g., SQL queries and statements).

User Device 115

Figure 3A:
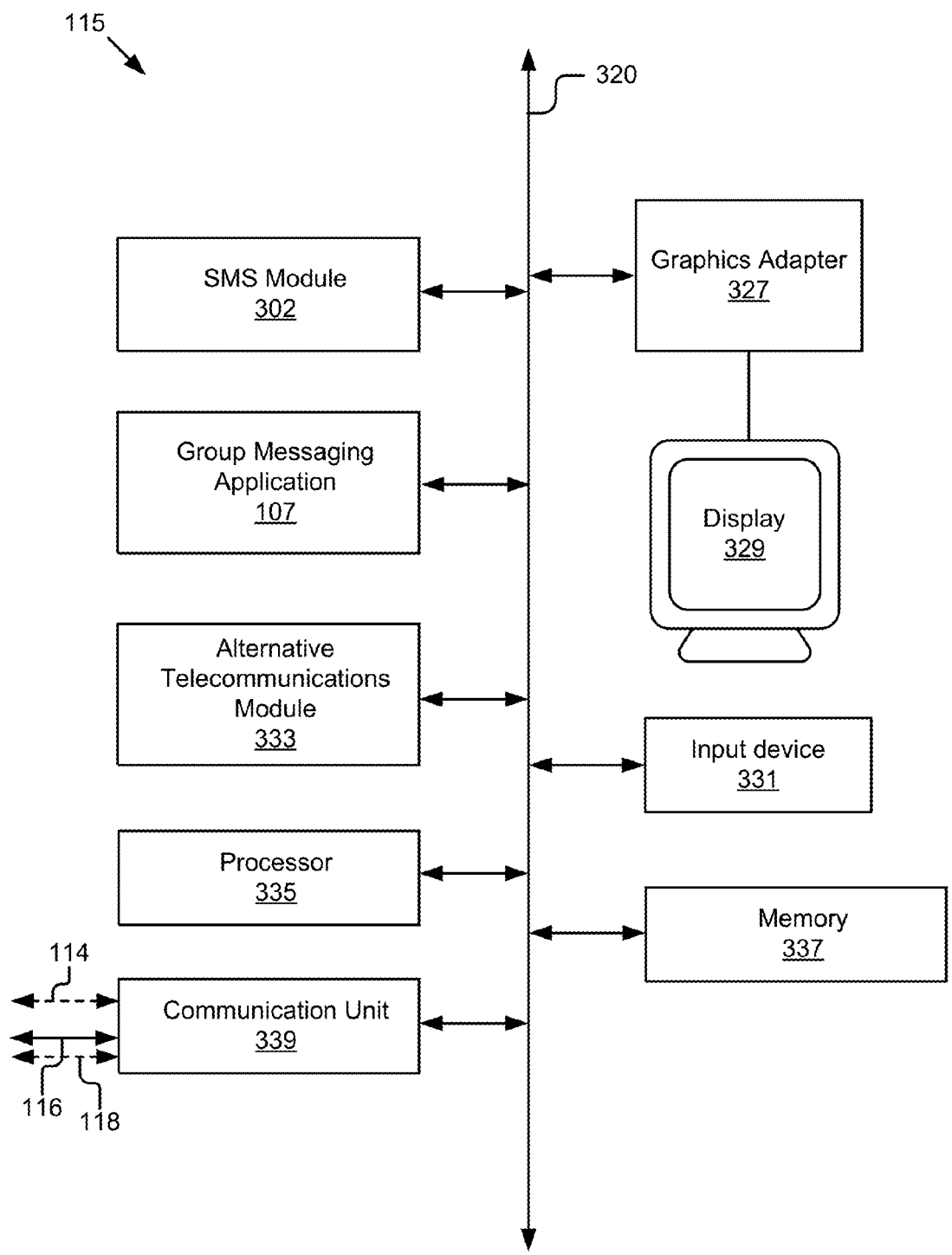
FIGS. 3A and 3B are block diagrams illustrating a user device including a group messaging application according to some embodiments of the present disclosure.
Figure 3B:
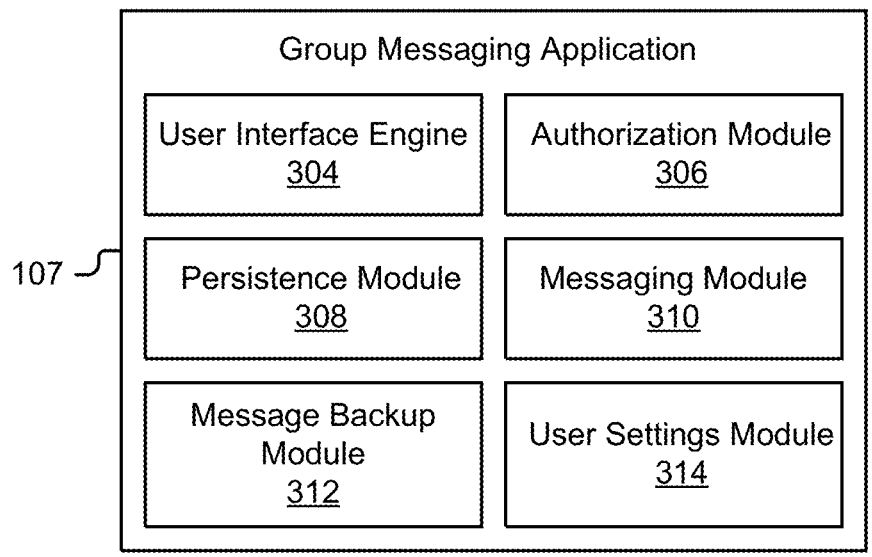

FIGS. 3A and 3B are block diagrams illustrating a user device 115 including a group messaging application 107 according to some embodiments of the present disclosure. In particular, the user device 115 is depicted as including an SMS module 302, the group messaging application 107, a graphics adapter 327, an input device 331, an alternative telecommunications module 333, a processor 335, a memory 337 and a communication unit 339. The user device 115 may also include a display 329, which is coupled to the graphics adapter 327. The components 107, 302, 327, 329, 331, 333, 335, 337 and 339 are communicatively coupled via a data communication bus 320. In some embodiments, the functionality of the bus 320 is provided by an interconnecting chipset.

The SMS module 302 is software including routines for sending and receiving text messages via an SMS, MMS, etc. of the mobile network 106. In some embodiments, the SMS module 302 is a set of instructions executable by the processor 335 to provide this functionality. In other embodiments, the SMS module 302 is stored in the memory 337 of the user device 115 and is accessible and executable by the processor 335 to provide this functionality. In the foregoing embodiments, the SMS module 302 may be adapted for cooperation and communication with the processor 335 and other components of the user device 115 via the bus 320. The SMS module 302 may send text messages to and receive text messages from other computing devices 115 coupled to the mobile network 106, other mobile networks, or to the network 105. For example, the SMS module 202 may send text messages to and receive text message from the SMS gateway 150, the telecommunications server 155, the email server 160 or other user devices 115 via an SMS or MMS of the mobile network 106. In some embodiments, the SMS module 302 sends and receives text messages via a messaging service (e.g., SMS, MMS, etc.) of the mobile network 106 using a text messaging protocol such as SMS or MMS protocol, etc.

In some embodiments, the SMS module 302 includes an API that allows other modules of the user device 115 interact with the SMS module 302. Other modules of the group messaging engine 103 and the social networking server 101 may interact with the SMS module 302 via the API to retrieve a summary of text messages communicated via the SMS module, send SMS messages, receive notification when a new SMS message has been received, etc. For example, the components of the group messaging application 107 and/or the group messaging application 107 itself may signal the SMS module 302 to send text messages, provide information or notifications about text messages that have been sent or received, etc. In some embodiments, the group messaging application 107 signals the SMS module 302 to generate text messages using information provided with the signal, and the SMS module 302 and generates and displays a user interface to a user 125 requesting authorization to send the generated text message. In other embodiments, the group messaging application 107 signals the SMS module 302 to generate a text message using information provided with the signal, and the SMS module 302 and generates and sends the text message without further interaction from a user 125.

The graphics adapter 327 displays images and other information on the display 329. The graphics adapter 327 may be a separate processing device including a separate processor and memory (not shown) or may be integrated with the processor 335 and memory 337. The display 329 represents any device equipped to display electronic images and data as described herein. The display 329 may be any a conventional display device, monitor or screen, such as an organic light-emitting diode (OLED) display, a liquid crystal display (LCD). In some embodiments, the display 329 is a touch-screen display capable of receiving input from one or more fingers of a user 125. For example, the display 329 may be a capacitive touch-screen display capable of detecting and interpreting multiple points of contact with the display surface.

The input device 331 is any device for inputting data on the user device 115. In some embodiments, the input device 331 is a touch-screen display capable of receiving input from the one or more fingers of the user 125. In these embodiment, the functionality of the input device 331 and the display 329 may be integrated, and a user 125 of the user device 115 interacts with the user device 115 by contacting a surface of the display 329 using one or more fingers. For example, the user 125 interacts with an emulated (i.e., virtual or soft) keyboard displayed on the touch-screen display 329 by using fingers to contact the display in the keyboard regions. In other embodiments, the input device 331 is a separate peripheral device or combination of devices. For example, the input device 331 includes a keyboard (e.g., a QWERTY keyboard) and a pointing device (e.g., a mouse or touchpad). The input device 331 may also include a microphone, a web camera or other similar audio or video capture devices.

The processor 335 comprises an arithmetic logic unit, a microprocessor, a general purpose controller or some other processor array to perform computations and optionally provide electronic display signals to the display device 329. The processor 335 communicates with the other components via the bus 320. Processor 335 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3A, multiple processors may be included. The user device 115 may also include an operating system executable by the processor 335 for managing, controlling and providing access to the functionality and resources of the user device 115 described herein.

The memory 337 stores instructions and/or data that may be executed by processor 335. The memory 337 communicates with the other components of user device 115 via bus 320. The instructions and/or data comprise code for performing any and/or all of the techniques described herein. The memory 337 may be a dynamic random access memory (DRAM) device, a static random access memory (SRAM) device, flash memory or some other known memory device. In some embodiments, the memory 337 also includes a non-volatile memory or similar permanent storage device and media including, for example, a hard disk drive, a floppy disk drive, a CD-ROM device, a DVD-ROM device, a DVD-RAM device, a DVD-RW device, a flash memory device or some other mass storage device known for storing information on a more permanent basis. In some embodiments, the group messaging application 107 is stored in the memory 337 and executable by the processor 335.

The communication unit 339 includes interfaces for interacting with other devices/networks of devices. In some embodiments, the communication unit 339 includes transceivers for sending and receiving wireless signals. For example, the communication unit 339 includes radio transceivers (4G, 3G, 2G, etc.) for communication with the mobile network 106, and radio transceivers for WiFi and Bluetooth® connectivity. In the depicted embodiment, the communication unit 339 is coupled to the network 105 by the signal line 114 and is coupled to the mobile network 106 via signal lines 116 and/or 118. In these or other embodiments, the communication unit 339 may include a network interface device (I/F), which includes ports for wired connectivity. For example, the communication unit 339 includes a CAT-5 interface, USB interface, or SD interface, etc. The interfaces of the communication unit 339 provide the network data connection to the network 105, the fallback data connection via the network 106 and other connections to other networks and devices using the protocols discussed above with regard to FIGS. 1 and 2, for example.

Group Messaging Application 107

The group messaging application 107 is software including routines for generating, sending and receiving message data via one or more messaging protocols. In particular the group messaging application 107 may receive input signals from a user 125, generate message data and user settings from the input signals, send data to and receive data from the other components of the system 100 and the social network server 101, and manage user settings. In some embodiments, the group messaging application 107 is a set of instructions executable by the processor 335 to provide this functionality. In other embodiments, the group messaging application 107 is stored in the memory 337 of the user device 115 and is accessible and executable by the processor 335 to provide this functionality. In any of the foregoing embodiments, the group messaging application 107 may be adapted for cooperation and communication with the processor 335 and the other components of the user device 115 via the bus 320. In some embodiments, the messages generated, sent and received by the group messaging application 107 have a format compatible with the protocol native to the group messaging engine 103 or a format compatible with a fallback messaging service, such as the messaging services operated by the mobile network 106, the telecommunications server 155, the SMS gateway 150, and other components of the system 100.

In the depicted embodiment, the group messaging application 107 includes a user interface engine 304, an authorization module 306, a persistence module 308, a messaging module 310, a message backup module 312 and a user settings module 314. The user interface engine 304, the authorization module 306, the persistence module 308, the messaging module 310, the message backup module 312 and the user settings module 314 are coupled for communication with each other and the other components of the user device 115 via the bus 320.

The user interface engine 304 is software including routines for rendering user interfaces and for receiving user input via the user interfaces. In some embodiments, the user interface engine 304 is a set of instructions executable by the processor 335 to provide this functionality. In other embodiments, the user interface engine 304 is stored in the memory 337 of the user device 115 and is accessible and executable by the processor 335 to provide this functionality. In the foregoing embodiments, the user interface engine 304 may be adapted for cooperation and communication with the processor 335 and other components of the user device 115 via the bus 320. The user interface engine 304 may be coupled to the input device 331 via the bus 320 to receive input signals from the user 125. For example, a user 125 composes a message using the input device 331, and the user interface engine 304 receives signals describing the composed message and stores the signals in the memory 337 for retrieval by the messaging module 310. In other embodiments, the user interface engine 304 is coupled to the messaging module 310 via the bus 320 to provide the signals directly to the messaging module 310.

The user interface engine 304 may be coupled to the SMS module 302 via the bus 320 to receive messaging information. In some embodiments, the user interface engine 304 may signal the SMS module 302 to provide information about all text messages that have been sent or received by the SMS module 302, including metadata and the body of the text messages. The user interface engine 304 may store the messaging information in the messaging data store 241 for later reference, manipulation and/or retrieval. The messaging information may include any information related to the management and transmission of the text messages, including the protocol by which the text messages were sent (e.g., SMS, MMS, XMS, etc.), the date and time the text messages were sent, sender and recipient information (e.g., phone numbers the text messages were sent to and received from, information identifying the users 125 associated with the phone numbers, etc.), the message texts, message thread information interconnecting the text messages, etc. In some embodiments, the user interface engine 304 may interact with the SMS module 302, for example, to receive the messaging information, using an API provided by the SMS module 302.

Figure 7:
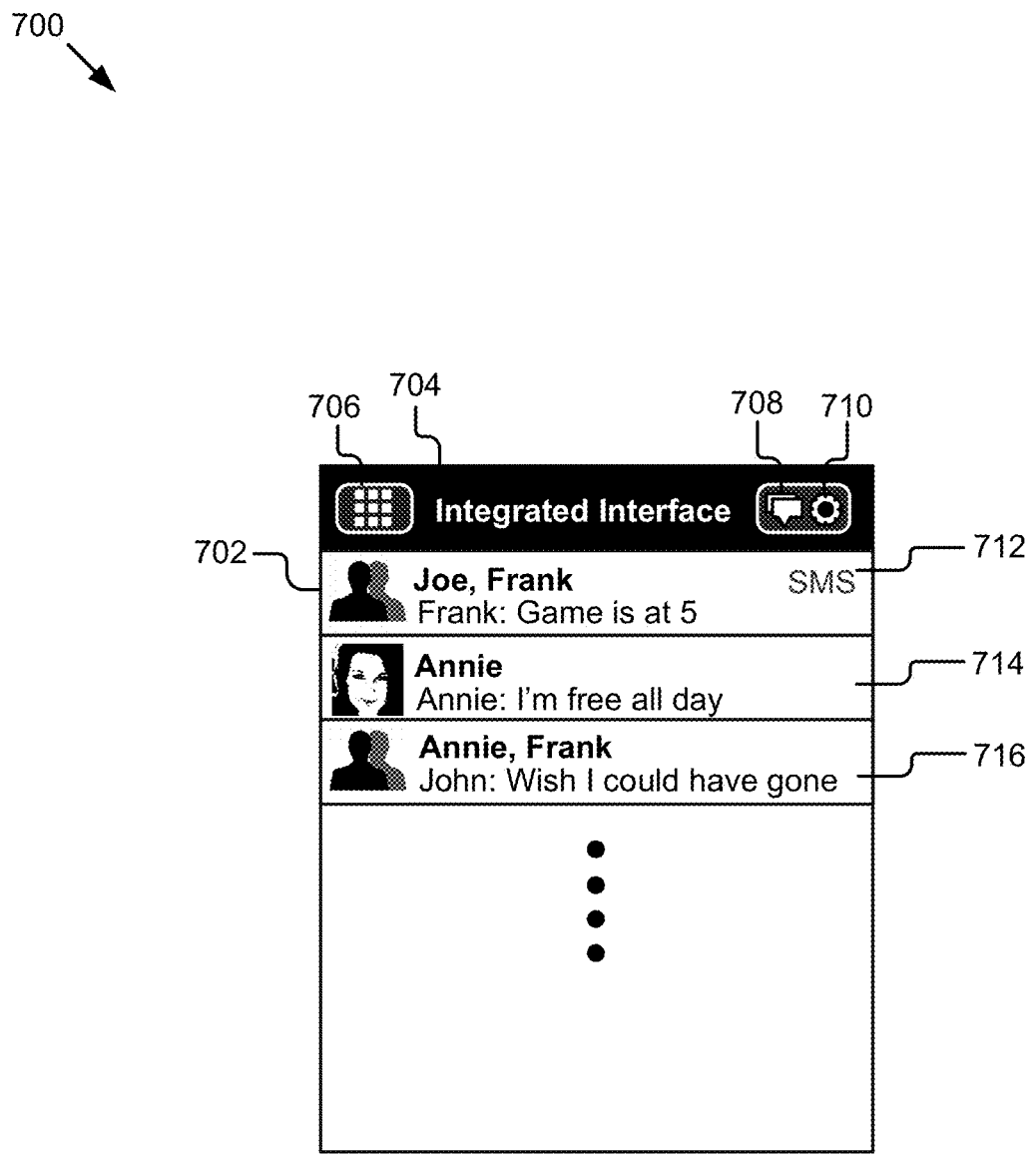
FIG. 7 is a graphic representation of an integrated user interface according to some embodiments of the present disclosure.
Figure 8:
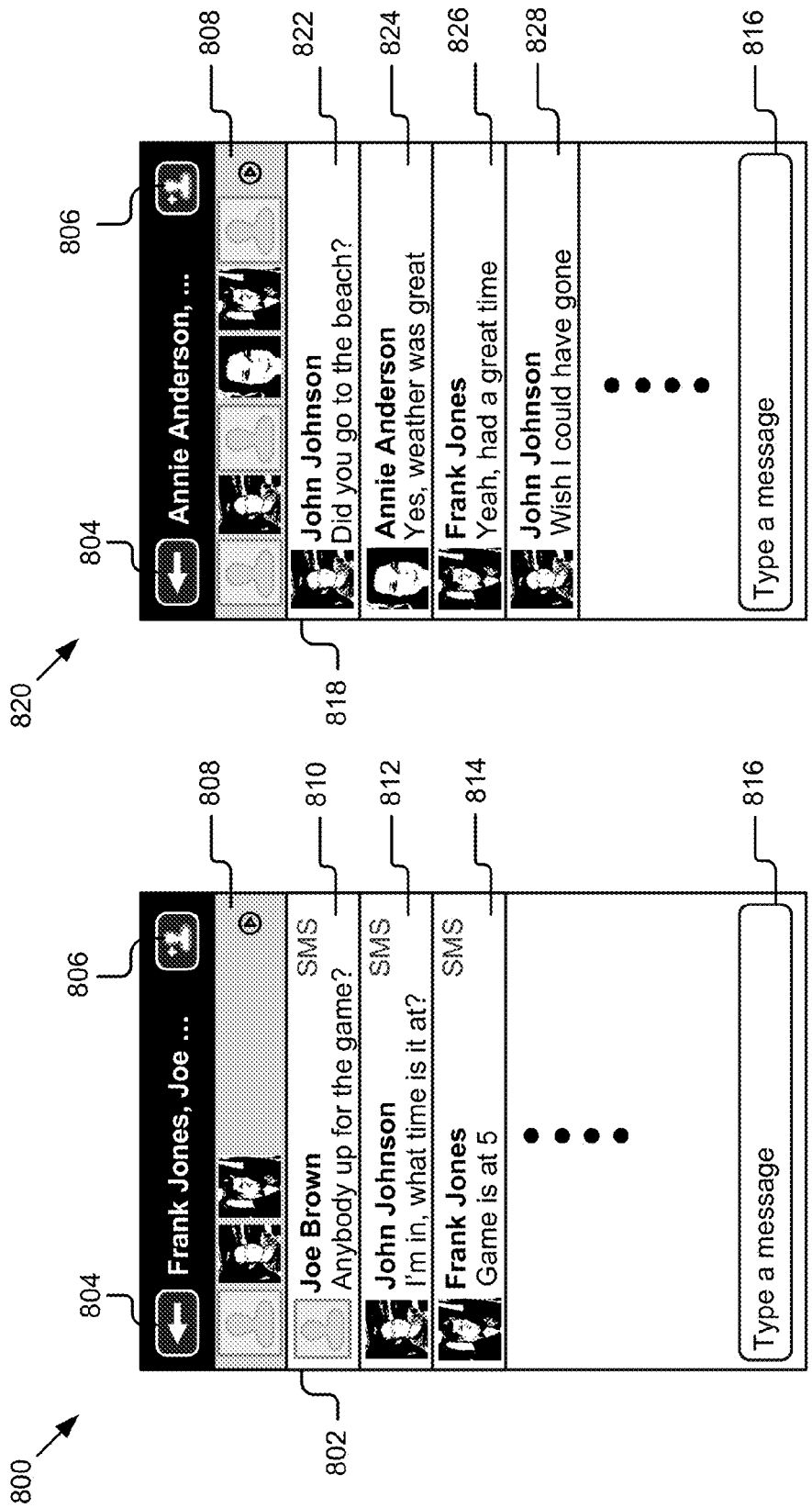
FIGS. 8A and 8B are graphic representations of user interfaces for viewing message threads according to some embodiments of the present disclosure.
Figure 9:
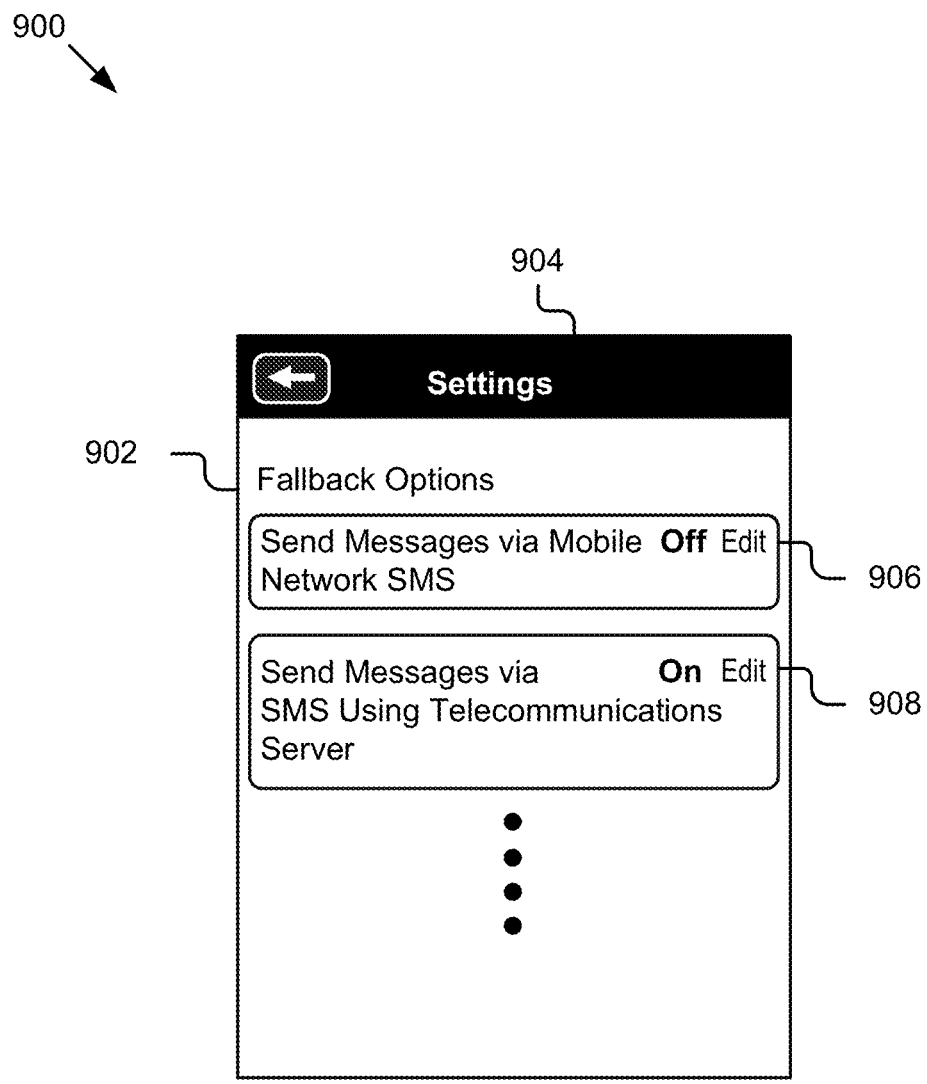
FIG. 9 is a graphic representation of a user interface for managing user settings according to some embodiments of the present disclosure.

The user interfaces generated by the user interface engine 304 can include, but are not limited to, a message entry form for composing messages, an integrated interface for viewing sent and received messages (e.g., see FIG. 7), interfaces for viewing native and non-native message threads (e.g., see FIGS. 8A and B), or a combination thereof, and a settings dialog (e.g., see FIG. 7) for inputting, modifying and displaying user preferences related to the group messaging application 107 and the group messaging engine 103. In some embodiments, the user interfaces include user interface elements that allow users 125 to interact with the user device 115 to input information and commands, such as text entry fields, selection boxes, drop-down menus, buttons, virtual keyboards and numeric pads, etc. In some embodiments, the message entry form includes an input field, such as a drop-down menu, for inputting the recipients of the message and a field for defining the body of the message. In selecting recipients, the user 125 can, for example, select from social circles of the user 125's social graph retrievable from the social graph 130. The user interface engine 304 may generate this drop-down menu by querying the social graph 130 of the social network for all of the social circles defined by the user 125 of the user device 115 and populating the drop-down menu with the social circles. In some embodiments, a user 125 defines social circles for family, friends, acquaintances, work contacts, etc. from his or her contacts on the social network. The user interface engine 304 can also populate the dropdown with information from other sources, such as a database of contacts stored in the memory 337 which are associated with telephonic features of the user device 115. For example, the database of contacts may include a list of names and phone numbers associated with other users 125 and their user devices 115. As previously discussed, examples of user interfaces generated for display on the display 329 of the user device 115a by the user interface engine 304 are illustrated in FIGS. 7-9, and are discussed in further detail below.

The authorization module 306 is software including routines for determining whether a recipient/user 125 is authorized to exchange messages via the group messaging engine 103. In some embodiments, the authorization module 306 is a set of instructions executable by the processor 335 to provide this functionality. In other embodiments, the authorization module 306 is stored in the memory 337 of the user device 115 and is accessible and executable by the processor 335 to provide this functionality. In the foregoing embodiments, the authorization module 306 may be adapted for cooperation and communication with the processor 335 and other components of the user device 115 via the bus 320.

The authorization module 306 may be coupled to the social network server 101 via the network 105 to send and receive authorization information. In some embodiments, the authorization module 306 may generate and send an authorization request to the social network server 101 requesting confirmation that one or more of the recipients are registered users of the group messaging engine 103, and in reply, a credentials module (not shown) of the group messaging engine 103 or the social network software application 102 of the social network server 101 may send an authorization response verifying whether the one or more recipient/users 125 are authorized to exchange messages via the group messaging engine 103. In some embodiments, the authorization request may include information identifying the recipients, such as a user identifier, a phone number, a name, user device 115 identification information, etc. The credentials module may be the same or similar to the credentials module discussed above and a description of it will not be repeated here. In other embodiments, the authorization module 306 may query a local database stored in the memory 337 for information identifying the one or more recipients/users 125 as being authorized to use the group messaging engine 103 for the recipient. The local database may be populated with information retrieved earlier from another information source, such as the group messaging engine 103, the social network software application 102, the connection server 140, the social graph 130, or the user 125, for example.

The persistence module 308 is software including routines for maintaining a persistent connection with the connection server 140 when the user device 115 is coupled to the network 105 via the network data connection and providing connection data. In some embodiments, the persistence module 308 is a set of instructions executable by the processor 335 to provide this functionality. In other embodiments, the persistence module 308 is stored in the memory 337 of the user device 115 and is accessible and executable by the processor 335 to provide this functionality. In the foregoing embodiments, the persistence module 308 may be adapted for cooperation and communication with the processor 335 and other components of the user device 115 via the bus 320.

The persistence module 308 may be coupled to the communication unit 339 via the bus 320. In some embodiments, the persistence module 308 receives a connectivity signal from the communication unit 339 indicating whether the communication unit 339 is coupled to the network 105, either directly, and/or indirectly via the mobile network 106. If the connectivity signal indicates that the communication unit 339 is coupled to the network 105, either directly via signal line 114 and/or indirectly via signal line 118, as previously described, the persistence module 308 may generate and send a connection request to the connection server 140. In response to receiving the request, the connection server 140 may identify the user device 115 using identifying information provided in the request and maintain an open/persistent connection with the user device 115 if the user device 115 is properly identified by the connection server 140. In some embodiments, the identifying information provided in the request is a unique identifier associated with a user 125 of the user device 115 or the user device 115 itself. For example the identifying information may include one or more of a mobile network subscriber key, a media access control address (MAC address), an IP address of the user device 115, information identifying the group messaging application 107 and a version level thereof, a user identifier for the social network, etc.

The persistence module 308 may generate and provide connection data describing the availability of a network data connection, the availability of a connection to the connection server 140, connectivity of other user devices 115, etc. The persistence module 308 may generate the connection data based at least in part on the connection information received from the connection server 140 and the connectivity signal or signals received from the communication unit 339 describing the connection state of the user device 115 to the network 105 and/or the network 106. For example, the connection data may describe whether a network data connection and/or a fallback data connection exists for the user device 115, and whether the persistence module 308 was able to connect to, login to, and/or interact with the connection server 140 via the network data connection. In some embodiments, the persistence module 308 is coupled to the other elements of the group messaging application 107, such as the messaging module 310, via the bus 320 to provide the connection data.

The messaging module 310 is software including routines for generating and selectively routing messages via the network data connection and the fallback data connection. The data connection by which the messaging module 310 routes messages may be based on whether a network data connection is available to the user device 115, whether a recipient is authorized to exchange messages via the group messaging engine 103, a user setting, instructions input by a user, etc. In some embodiments, the messaging module 310 is a set of instructions executable by the processor 335 to provide this functionality. In other embodiments, the messaging module 310 is stored in the memory 337 of the user device 115 and is accessible and executable by the processor 335 to provide this functionality. In the foregoing embodiments, the messaging module 310 may be adapted for cooperation and communication with the processor 335 and other components of the user device 115 via the bus 320.

The messaging module 310 may perform various functions including receiving messages from other user devices 115 using the group messaging engine 103 or various fallback messaging services and sending messages to other user devices 115 using the group messaging engine 103 or various fallback messaging services. For receiving message data describing a message from another user device 115, the messaging module 310 may, for example, be coupled to the communication unit 339 or the SMS module 302 via the bus 320. In some embodiments, the messaging module 310 is coupled the communication unit 339 to receive the message data from another user device 115 via the group messaging engine 103 over the network data connection. In other embodiments, the messaging module 310 is coupled to the SMS module 302 of the user device 115 to receive message data that has been received by the SMS module 302 from another user device 115 using a messaging service (e.g., an SMS, MMS, etc.) of the mobile network 106. In yet other embodiments, the messaging module 310 is coupled directly to the messaging service of the mobile network 106 via the communication unit 339 and elements of the mobile network 106 to receive the message data (e.g., an SMS message). Upon receiving the message data, the messaging module 310 may perform various operations including converting and annotating the message data, storing the message data, signaling the user interface engine 304 to display the message data, etc. In some embodiments where the message data represents a text message received via a fallback messaging service (e.g., SMS), the messaging module 310 may convert the message data to a format native to the group messaging application 107 and/or group messaging engine 103, and relate the message data to other associated messages which belong to the same message thread. The messaging module 310 may store the message data in the memory 337 for later use/reference. The messaging module 310 may also signal the message backup module 312 to store the message data on the social network server 101 in the messaging data store 241 for archiving and later use/reference. For displaying the message data to the user 125, the messaging module 310 may signal the user interface engine 304 to generate and present a notification to the user 125 that a message has been received, and/or signal the user interface engine 304 generate an interface or update a previously generated user interface to display the message data to the user 125 (e.g., see FIGS. 7-8B).

The messaging module 310 may selectively route the message data for transmission via different messaging services based at least in part on one or more of input provided by the user 125, connection data provided by the persistence module 308, authorization information provided by the authorization module 306, etc. In some embodiments, the messaging module 310 may be coupled to the user interface engine 304 via the bus 320 to receive input signals describing the message input by the user 125, and generate and send the message based at least in part on the input signals. In some embodiments, the user 125 may dictate which messaging service the message should be sent using. For example, the user 125 may specify that a message should be send via SMS, MMS, group messaging engine 103, telecommunications server 155, etc. In other embodiments, the messaging module 310 may automatically determine which message service should be used to dispatch the message data. The messaging module 310 may default to using the group messaging engine 103, which may be the messaging service providing the richest media experience to a user 125 and, if the group messaging engine 103 is unavailable, the messaging module 310 may defer to a fallback messaging service that is the next-richest (e.g., an MMS or SMS) and so on and so forth until a messaging service by which the message can be sent by is determined to be available.

In some embodiments, the messaging module 310 may determine whether the group messaging engine 103 is available to exchange messages using connection data provided by the persistence module 308. The messaging module 310 may be coupled to the persistence module 308 via the bus 320 to send and receive information. In some embodiments, the messaging module 310 requests connection data from the persistence module 308 indicating whether the connection server 140 and the user device 115 are connected via the network data connection. The persistence module 308 may generate and send the connection data to the messaging module 310 in response to receiving a signal for it from the messaging module 310. In some embodiments, the messaging module 310 may use the connection data to determine whether to transmit message data to another user device 115 via the group messaging engine 103 or via a fallback messaging service. By way of example, the persistence module 308 may send connection data to the messaging module 310 indicating that the user device 115 is not coupled to the network 105 via a network data connection (e.g., via a WLAN of the network 105 or a WWAN of the mobile network 106) and is coupled to the mobile network 106 via a fallback data connection (e.g., a control channel), and based on the connection data, the messaging module 310 routes the message via the fallback data connection (e.g., an SMS of the mobile network 016) as an SMS message. In another example, the persistence module 308 may send connection data indicating that a network data connection exists coupling the user device 115 to the network 105 (whether it be directly or indirectly) and the connection server 140, etc., and the messaging module 310 may route the message data to the group messaging engine 103 for delivery to one or more other user devices 115 via the network data connection.

In various embodiments, once a network data connection is determined to exist between the user device 115 and the connection server 140, the messaging module 310 may determine whether each designated recipient/user 125 of the message data is authorized to use the group messaging engine 103 to receive/exchange messages. In some embodiments, the messaging module 310 may be coupled to the authorization module 306 via the bus 320 to send and receive information related to whether one or more recipients associated with the message data are authorized to receive the message data via the group messaging engine 103. For example, the messaging module 310 may send identification information identifying the designated recipients/users 125 of the message data to the authorization module 306, and the authorization module 306 may compare the identification information to authorization information managed/retrievable by the authorization module 306 to determine whether each of the recipients included in the identification information are authorized users of the group messaging engine 103 and may receive messages using the group messaging engine 103. In other embodiments, the messaging module 310 may send the message data to the group messaging engine 103 and the group messaging engine 103 may determine whether each recipient/user 125 is authorized or able to receive the message data via the group messaging engine 103 or a fallback messaging service, such as the fallback messaging service provided by the SMS gateway 150.

In some embodiments where the messaging module 310 sends the message data via the group messaging engine 103 using the network data connection, the messaging module 310 may send it using a protocol native to the group messaging application 107 and/or the group messaging engine 103. In other embodiments where the messaging module 310 sends the message data via the fallback messaging service, the messaging module 310 sends it using a fallback protocol associated with the fallback messaging service. For example, if the fallback messaging service is an SMS of the mobile network 106, the messaging module 310 sends the message data via signal line 116 to an SMS of the mobile network 106 using a text messaging protocol, such as an SMS or MMS compatible protocol, and the SMS forwards the message to the designated recipient, be it another user device 115, the SMS gateway 150 or another entity of the system 100.

The messaging module 310 may be coupled via the bus 320 to the SMS module 302 of the user device 115 to send and receive messaging instructions. The messaging instructions may include an instruction to send a text message via a message service (e.g., SMS, MMS, etc.) of the mobile network 106. In some embodiments, the instruction signal may provide all information necessary for the SMS module 302 to send the text message. For example, the instruction may include the message content (e.g., text, pictures, video clips, etc.) and metadata describing which recipients are to receive the text message. The metadata may include (e.g., phone number(s) associated with other users 125, the SMS gateway, etc.). In other embodiments, the instruction may signal the SMS module 302 to display an interface for composing and sending a text message, and the user 125 manually inputs information into the interface. In yet other embodiments, the interface is pre-populated with information included in the instruction signal, and the SMS module 302 displays the interface to the user 125 to confirm the information and provide express authorization to send the text message. The SMS module 302 may provide a confirmation signal to the messaging module 310 to confirm that a text message has been successfully sent by the SMS module 302. In some embodiments, provision of the confirmation signal may be in response to receiving an instruction signal instructing that the confirmation signal be provided. In other embodiments, the confirmation signal may be automatically provided by the SMS module 302. In some embodiments, may interact with the SMS module 302 via an API provided by the SMS module 302.

To further illustrate various ways in which the messaging module 310 may send messages, the following additional non-limiting examples are provided. A sender/user 125 may wish to send a message to another user 125 via the group messaging engine 103. However, the sender's user device 115 may not be connected to the network 105, and thus may not be able to send the message via the group messaging engine 103. In light this, the sender may elect to send the message as an SMS message via an SMS of the mobile network 106 (i.e., a fallback message service). In another example, the sender/user 125 may not know whether a recipient/user 125 is authorized to exchange messages via the group messaging engine 103. To determine such, the sender may enter information identifying the recipient/user 125, such a phone number or an email address via an interface presented by the group messaging engine 304, and upon receiving this information, the authorization module 306 may perform a query to determine whether the recipient/user 125 is authorized to exchange messages via the group messaging engine 103, as previously described. If the recipient/user 125 is authorized, the messaging module 310 may proceed to transmit the message data to the group messaging engine 103 via the network data connection. In other examples the sender may instruct the messaging module 310 to send the message using one or more alternative/fallback messaging services, such as one provided by the telecommunications server 155, the mobile network 106, the email server 160, the SMS gateway 150, or the like. This instruction may be provided if the message cannot be sent via the group messaging engine 103 or may be provided independently of the availability of the group messaging engine 103.

The message backup module 312 is software including routines for backing-up message-related information. In some embodiments, the message backup module 312 is a set of instructions executable by the processor 335 to provide this functionality. In other embodiments, the message backup module 312 is stored in the memory 337 of the user device 115 and is accessible and executable by the processor 335 to provide this functionality. In the foregoing embodiments, the message backup module 312 may be adapted for cooperation and communication with the processor 335 and other components of the user device 115 via the bus 320.

The message backup module 312 is coupled to the communication unit 339 via the bus 320 to send and receive message-related data to the backup module 202 and the other entities of the system 100 over the network 105 and/or mobile network 106. In some embodiments, the message backup module 312 interacts and cooperates with the backup module 202 of the group messaging engine 103 to backup messages stored in the memory 337 of the user device 115. The user 125 may manually initiate a backup request to backup one or more messages via a user interface generated by the user interface engine 304, or the message backup module 312 may automatically initiate the backup request and determine which messages require backing-up. To automatically determine which messages require backing up, the message backup module 312 may identify if any messages associated with the one or more fallback messaging services are not associated with the group messaging engine 107. For example, the message backup module 312, which is coupled to the SMS module 302 and telecommunications module 333 via the bus 320, may retrieve messages managed by the SMS module 302 and/or alternative telecommunications module 333. The message backup module 312 may then compare those messages to the messages associated with the group messaging application 107 to determine if any messages are missing. The messages associated with the group messaging application 107 may be a local copy of the messages stored in the messaging data store 241 of the social network server 101 or may be retrievable from the social network server 101 at the time of comparison. In some embodiments, the message backup module 312 may monitor messages sent using various fallback messaging services (e.g., SMS module 302, alternative communication module 333) and backup these messages, either contemporaneously or at a later time, to keep messages stored in the messaging data store 241 synchronized with the messages being sent and received using the fallback messaging services.

In some embodiments, the backup module 202 of the group messaging engine 103 may identify if any messages associated with the one or more fallback messaging services are not associated with the group messaging engine 107. For example, the backup module 312 may provide a copy or summary of the messages managed by the SMS module 302 and/or alternative telecommunications module 333 to the group messaging engine 103 via the network 105, and the group messaging engine 103 (e.g., the backup module 202) may compare those messages to the messages stored in the messaging data store 241 to determine if any messages are missing from the messaging data store 241. Additional structure and functionality of the messages backup module 312 and the backup module 202 are described above with reference to FIG. 2 and below with reference to FIG. 6, for example.

The user settings module 314 is software including routines for storing, retrieving and sending user settings-related information. In some embodiments, the user settings module 314 is a set of instructions executable by the processor 335 to provide this functionality. In other embodiments, the user settings module 314 is stored in the memory 337 of the user device 115 and is accessible and executable by the processor 335 to provide this functionality. In the foregoing embodiments, the user settings module 314 may be adapted for cooperation and communication with the processor 335 and other components of the user device 115 via the bus 320.

The user settings module 314 may be coupled to the user interface engine 304 to receive input signals identified by the user interface engine 304 as user settings-related information. For example, to enter or modify the user 125's user settings, the user 125 selects user interface elements included in a user interface rendered by the user interface engine 304 using the input device 331. The user interface engine 304 identifies signals received from the input device 331 as user setting-related information and sends the signals to the user settings module 314. The user settings module 314 modifies behavior of the group messaging application 107 based on the user setting-related information received, and stores the user setting-related information for later reference and modification. In some embodiments, the user settings module 314 is capable of storing and retrieving data describing the user settings in and from the messaging data store 241 of the social network server 101, the memory 337 of the user device 115, or both. In some embodiments, some of the user settings maintained by the user settings module 314 are applicable to the group messaging engine 103. For example, the user 125 can control functionality of the messaging engine 204 of the group messaging engine 103 by modifying the settings presented a user settings interface, such as the user interface 900 depicted in FIG. 9.

Various additional structure and functionality of the group messaging engine 103, group messaging application, and other entities of the system 100 are further described below with reference to FIGS. 4-9, for example.

Methods

Figure 4:
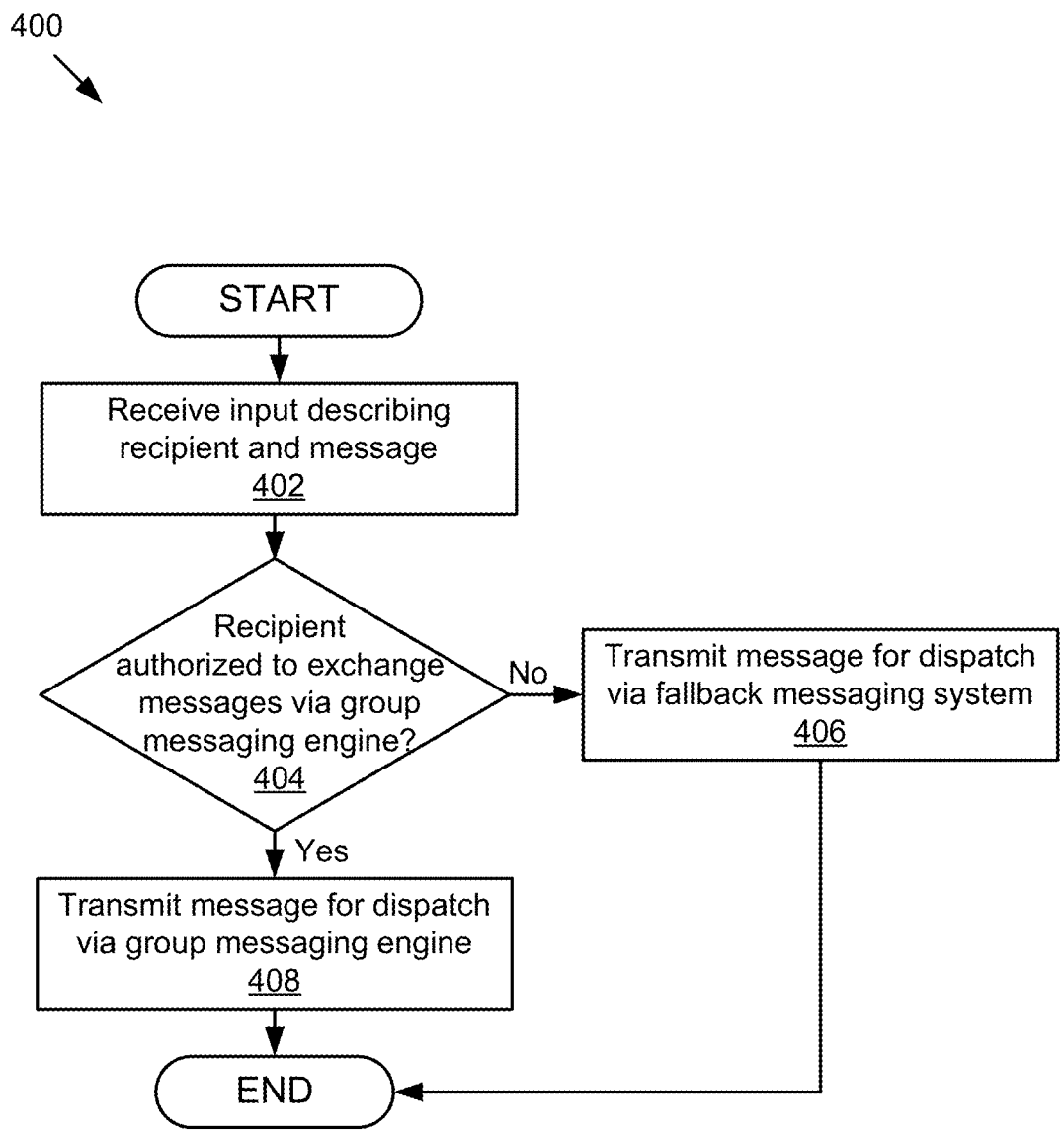
FIG. 4 is a flowchart of a method for integrated messaging according to some embodiments of the present disclosure.
Figure 5:
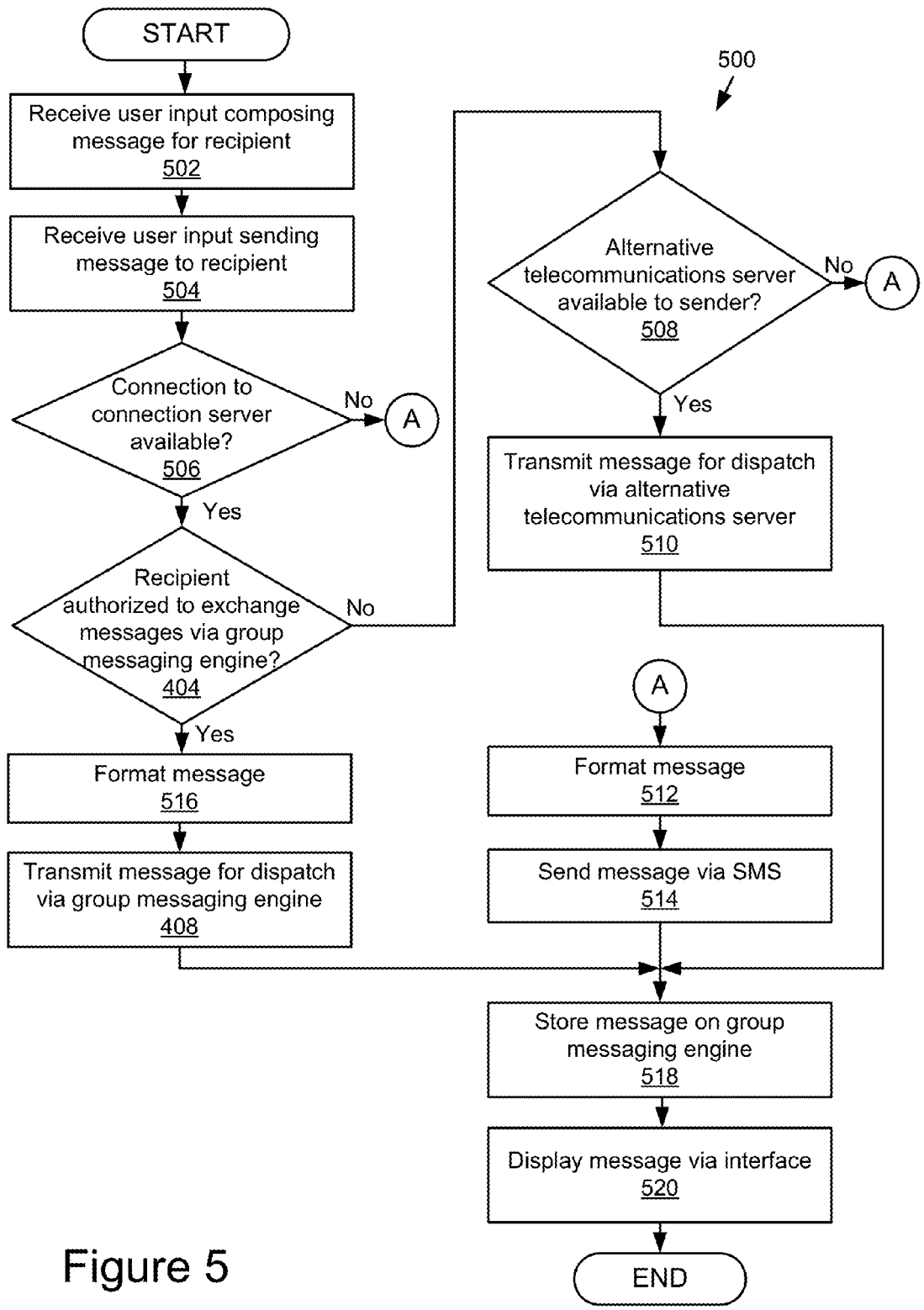
FIG. 5 is a flowchart of a method for integrated messaging according to some embodiments of the present disclosure.
Figure 6:
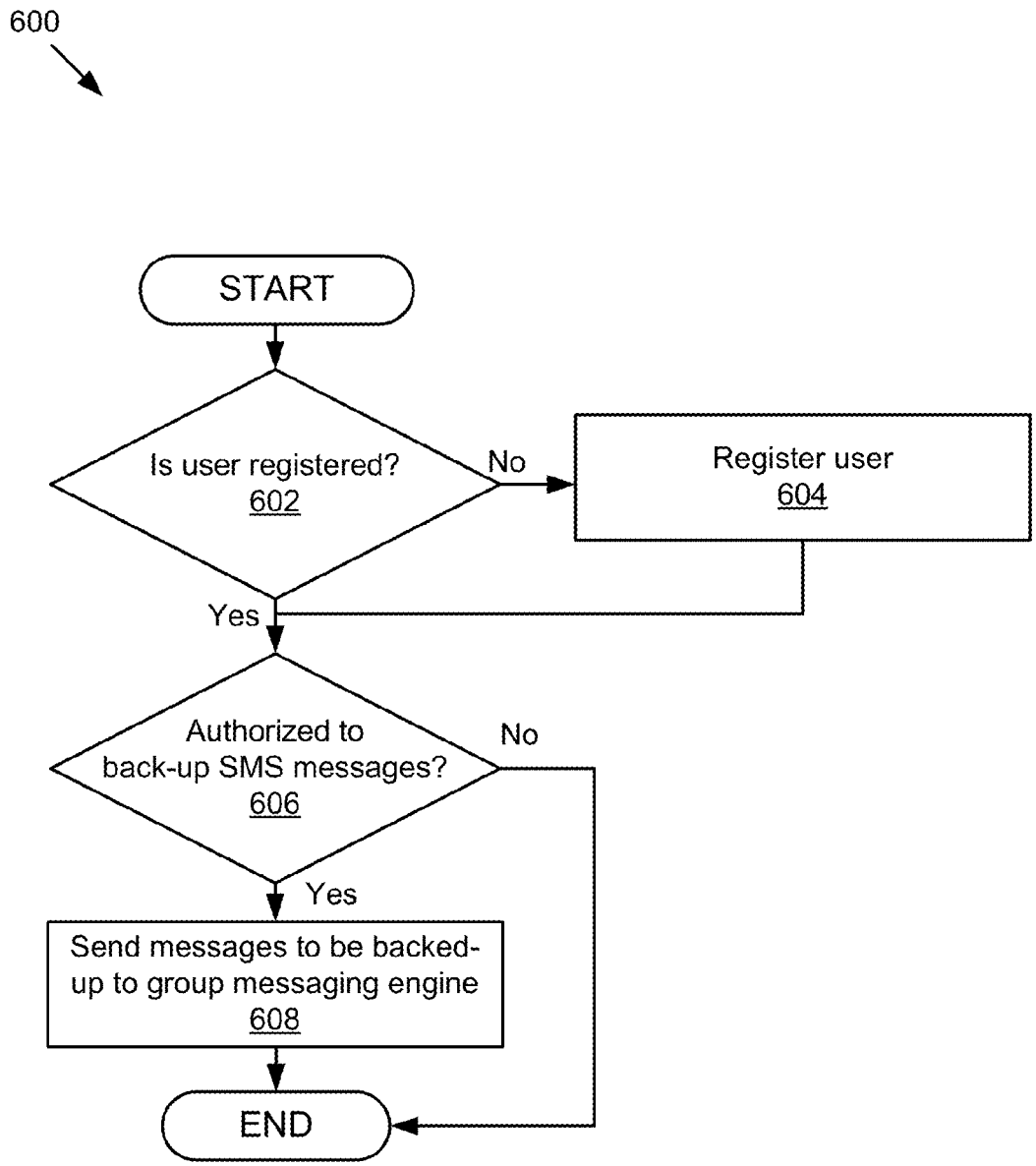
FIG. 6 is a flowchart of a method for backing-up messages according to some embodiments of the present disclosure.

Referring now to FIGS. 4-6, various embodiments of the methods of the present disclosure are described. FIG. 4 is a flowchart of a method 400 for integrated messaging according to some embodiments of the present disclosure. The method 400 begins by the user interface engine 304 receiving 402 input describing a recipient/user 125 and a message to be received by the recipient. For example, the user interface engine 304 may be coupled by the bus 320 to the input device 331 to receive 402 input signals from a user interacting with the input device 331. The method 400 continues by the authorization module 306 determining 404 whether the recipient is authorized to exchange messages via the group messaging engine 103.

In some embodiments, to make the determination 404, the authorization module 306 may generate and send an authorization request to the group messaging engine 103 of the social network server 101 requesting confirmation that the recipient is a registered user of the group messaging engine 103. In other embodiments, to make the determination 404, the authorization module 306 may query a local database of contacts that are authorized to use the group messaging engine 103 for the recipient. The method 400 continues by the messaging module 310 selectively transmitting the message for dispatch via a fallback messaging service or the group messaging engine 103. If the authorization module 306 determines 404 that the recipient is not authorized to exchange messages via the group messaging engine 103, the messaging module 310 transmits 406 the message data for dispatch to a user device 115 of the recipient via a fallback messaging service. In some embodiments, the fallback messaging service may be a messaging service of the mobile network, such as an SMS or an MMS. By way of example, the messaging module 310 may transmit 406 the message data via SMS protocol to a short message service center (SMSC) of the mobile network 106 for dispatch to the user device 115 of the recipient. In other non-limiting examples, the fallback messaging service may be an email service operated by the email server 160, a messaging service (e.g., SMS) operated by the telecommunications server 155, etc., and the messaging module 310 may transmit 406 the message using a protocol compatible with the fallback messaging service for dispatch to the user device 115 of the recipient.

If the authorization module 306 determines 404 that the recipient is authorized to exchange messages via the group messaging engine 103, the messaging module 310 transmits 408 the message data for dispatch to a user device 115 of the recipient via the group messaging engine 103. For example, the messaging module 310 may transmit 408 the message using messaging protocol native to the group messaging engine 103 via the network data connection 114 or 118 to the group messaging engine 103 of the social network server 101, and the group messaging engine 103 may then dispatch the message to a user device 115 of the recipient.

The group messaging application 107 operating on the user device 115 may then render or update a user interface to display the transmitted message and the method 400 is then complete and ends.

FIG. 5 is a flowchart of a method 500 for integrated messaging according to some embodiments of the present disclosure. As illustrated in FIG. 5, the method 500 includes steps similar to or the same as those described above for the method 400. For convenience and ease of understanding, those steps have the same reference numerals and perform the same or similar functions, and their description will not be repeated here. The method 500 begins by the user interface engine 304 receiving 502 input from a sender/user 125 describing a recipient/user 125 and composing a message for the recipient, and receiving 504 input from the sender instructing the group messaging application 107 to send the message to the recipient. The method 500 continues by the persistence module 308 determining 506 whether the sender's user device 115 is connected or connectable to the connection server 140, for example via a network data connection to the network 105. If a connection to the connection server 140 is unavailable, the method 500 proceeds to block 512 as further discussed below. However, if a connection to the connection server 140 is available, the method 500 continues by the authorization module 306 determining 404 whether the recipient is authorized to exchange messages via the group messaging engine 103 as previously described above with respect to FIG. 4.

If the authorization module 306 determines 404 the recipient to be authorized, the messaging module 310 formats 516 the message in a format native to the group messaging application 107, and, as previously described above with respect to FIG. 4, transmits 408 the message to the group messaging engine 103 for dispatch to the user device 115 of the recipient. If the authorization module 306 determines 404 the recipient to be unauthorized, the method 500 continues by the messaging module 310 determining 508 whether a telecommunications server 155 is available to the user 125 for sending the message as an alternative and/or whether the sender wishes to send the message via the telecommunications server 155. In some embodiments, to make the determination 508, the messaging module 310 may verify whether an alternative telecommunications module 333 is accessible and executable by the processor 335 of the user device 115 for sending the message, and if so, provided the sender has given authorization or provided instruction to send the message via the telecommunications server 155, the method 500 may proceed to block 510. Additionally, to make the determination 508, the messaging module 310 may interact with the alternative telecommunications module 333 to determine whether the user 125 sending the message is authorized to send and receive messages via the telecommunications server 155 and may interact with the user settings module 314 to determine whether a user setting (e.g., see FIG. 9, 908) has been set by the user 125 instructing the messaging module 310 to send messages via the telecommunications server 155 as a fallback.

If the messaging module 310 determines 508 that the telecommunications server 155 is available to the user 125 for sending the message, the messaging module 310 transmits 510 the message to the telecommunications server 155 via a protocol compatible with the telecommunications server 155, and the telecommunications server 155 prepares and sends the message as a text message (e.g., SMS, MMS, etc., message) to the user device 115 of the recipient. If the messaging module 310 determines 508 that the telecommunications server 155 is unavailable to the user 125 for sending the message, the method 500 continues by the messaging module 310 formatting 512 the message in a format compatible with a text messaging protocol (e.g., SMS, MMS, etc.) and transmitting 514 the message (e.g., via the SMS module 302) using that protocol to a messaging service (e.g., SMS, MMS, etc.) of the mobile network 106 for dispatch to the user device 115 of the recipient.

Next, the method 500 stores 518 the message on the group messaging engine 103. In some embodiments, if the message is transmitted 408 for dispatch via the group messaging engine 103, a copy of the message is stored by the group messaging engine 103 in the messaging data store 241, either by instruction or automatically. In other embodiments, if the message is dispatched in steps 510 and/or 514 via a fallback messaging service, the message backup module 312 may archive a copy of the message by transmitting 516 the message to the group messaging engine 103 for storage in the messaging data store 241. For example, if a connection to the connection server 140 in block 506 is determined to be unavailable, the message may be archived by the message backup module 312 to the group messaging engine 103 once connectivity to the connection server 140 has been reestablished. When transmitting 516 the message for storage, the message backup module 312 may annotate the message with information associating the message with its corresponding message thread. Backing up the message to the group messaging engine 103 advantageously allows the message to be retrieved by the user 125 who sent the message or the user 125 receiving the message, should the message ever inadvertently be deleted from the user device 115 of the user. Additionally, it provides the convenience of retrieving the message from the group messaging engine 103 either as a standalone message or with any other messages that are part of a common message thread.

The method 500 continues by the user interface engine 304 generating a user interface and/or updating a previously generated user interface, such as the example interfaces illustrated in FIGS. 7, 8A and 8B, to display 520 the message to the user 125 who sent it. For example, the message may be advantageously displayed 520 along with any other messages that are part of a common message thread, as in FIGS. 8A and 8B, or the message may be advantageously displayed 520, at least in part, in an integrated interface, such as the example interface illustrated in FIG. 7. The method 500 is then complete and ends.

FIG. 6 is a flowchart of a method 600 for backing-up/promoting messages according to some embodiments of the present disclosure. The method 600 begins by the authorization module 306 determining 602 whether a user 125 is registered to exchange messages via the group messaging engine 103. In some embodiments, to determine 602 if the user 125 is registered, the authorization module 306 collects the user 125's credentials and interacts with a credentials module (not shown) of the social network server 101 to authenticate the user 125, and if authentication is successful, the authorization module 306 determines 602 the user 125 to be registered. In some embodiments, if the authorization module 306 determines 602 the user 125 to be unregistered, the authorization module 306, in cooperation with the user interface engine 304, prompts the user 125 to set up a user account, for example, by entering unique identifying information, and submits a request to the social network server 101 for a new account for the user 125.

Next, the method 600 continues by the message backup module 312 determining 606 whether authorization has been granted to back up the text messages (e.g., SMS, MMS, etc., messages) stored in the memory 337 of the user device 115. In some embodiments, the message backup module 312 prompts the user 125 via an interface generated by the user interface engine 304 for authorization to back up the stored text messages (e.g., SMS messages), and if the user provides authorization, the message backup module 606 sends 608 any stored text messages that have not yet been backed up to the group messaging engine 103. The method 600 is then complete and ends. The method 600 is advantageous because it provides the user 125 the benefit of archiving the text messages (e.g., SMS, MMS, etc.) stored in the memory 337 of the user device 115 to the social network server 101, and accessing the messages at a later time via a convenient integrated user interface of the group messaging application 107, for example, should the user device 115 of the user 125 every be replaced, stolen or lost.

To further illustrate method 600, the following non-limiting example is provided. A user 125 uses the SMS module 302 native to the user device 115 (e.g., mobile phone) to send SMS, MMS, etc., messages to other users 125. The user 125 then later begins to use the group messaging application 107 to send messages to other users 125. Provided the user 125 gives authorization, the message backup module 107 can retrieve the SMS, MMS, etc., messages sent via the SMS module from the memory 337 of the user device 115 and transmit them to the group messaging engine 103 to be backed up. Then, should the need arise (e.g., if the user 125 ever switches to a new user device 115 that does not contain any of the messages), the user 125 can restore all messages, both SMS, MMS, etc., messages exchanged via the SMS module of the previous user device 115 and messages exchanged via the group messaging engine 103, by having the instance of group messaging application 107 operating on the new user device 115 retrieve them from the group messaging engine 103.

While the above-described methods 400, 500 and 600 and advantages are depicted and described, in some embodiments, in the context of SMS messaging, other fallback messaging services discussed above, such as MMS, XMS, email, IM, etc., are contemplated and fall within the scope of the present disclosure.

User Interfaces

FIGS. 7-9 are graphic representations of user interfaces according to some embodiments of the present disclosure. FIG. 7 is a graphic representation of an integrated user interface 700 according to some embodiments the present disclosure. The integrated user interface 700, which in some embodiments is generated by the user interface engine 304, includes a window 702 containing various elements including a toolbar 704 and message thread regions 712, 714 and 716. The toolbar 704 may include a menu button 706, a new message button 708 and an options button 710. In some embodiments, the menu button 706 returns a user 125 to a home menu screen providing various options to the user 125 for using various functionality provided by the group messaging engine 103 and the social network software application 102. The new message button 708, in some embodiments, when selected initializes a user interface (not shown) for the user 125 to compose a new message. This user interface for composing a new message may include a recipient entry field for the user 125 to enter information identifying the one or more recipients that are to receive the message and a message entry field for composing the message. In some embodiments, the recipient entry field allows a user 125 to add recipients/users 125 to the message being composed from a database of contacts stored on the user device 115 or from contacts and/or social circles stored in and retrievable from the social graph 130 and/or other entities of the system 100, such as the social network server 101. In some embodiments, phone contacts that do not have user accounts for the social network software application 102 and are addressable via a mobile phone number can be added to the messaging group and the group messaging engine 103 will exchange messages between those phone contacts and the other members of the messaging group via a text messaging protocol, such as SMS. In some embodiments, the interface for composing a new message is similar to the user interfaces depicted in FIGS. 8A and/or 8B. The options button, when selected, may initialize an options interface, such as the options interface 900 depicted in FIG. 9, for managing user settings regulating various aspects of the group messaging engine 103 and/or group messaging application 107, as described in further detail below.

The message thread regions 712, 714 and 716 represent message threads containing one or more messages sent and/or received by the user 125. In the depicted embodiment, the integrated interface 700 includes a combination of text and native message threads. For example, message thread region 712 represents one or more text (e.g., SMS) messages exchanged between the user 125 and one or more other users 125. In some embodiments, selecting the message thread region 712 using input device 331 instructs the user interface engine 304 to generate and display a user interface presenting the one or more text messages that have been exchanged between the user 125 and one or more other users 125 for that thread. For example, in the depicted embodiment, selecting the message thread region 712 initializes the display of user interface 800 as depicted in FIG. 8A. Similarly, the message thread regions 714 and 716 each represent, for example, one or more messages exchanged between the user 125 and one or more other users 125 via the group messaging engine 103. As with region 712, in some embodiments, selecting the message thread region 714 or 716 using the input device 331 instructs the user interface engine 304 to generate and display user interfaces for viewing the messages exchanged between users 125 associated with those threads. For example, in the depicted embodiment, selecting message thread region 714 initializes the display of user interface 820 as depicted in FIG. 8B. The integrated interface is advantageous as it allows messages being sent via text message (e.g., SMS) or another fallback messaging service, as well as messages being sent via the group messaging engine 103, to be viewed, composed and otherwise managed by a user 125 using the same software application (e.g., the social network software application 102) operating on the user device 125. This provides the user 125 a seamless messaging experience and relieves the user 125 from having to install, configure and switch between multiple messaging environments to communication with other users 125.

FIGS. 8A and 8B are graphic representations of user interfaces 800 and 820, respectively, for viewing message threads according to some embodiments of the present disclosure. With reference to FIG. 8A, the user interface 800, which in some embodiments is generated by the user interface engine 304, is a user interface for viewing a text message thread, such as an SMS message thread. The user interface 800 may include a window 802 having various components including toolbar buttons 804 and 806, a horizontal scroll region 808, message regions 810, 812 and 814 and a message entry field 816. The window 802 may be a container for the other elements of the user interface 800. The toolbar button 804 is a button for adding one or more other users 125 to the messaging group. In some embodiments, selecting this button activates a dialog which allows a user 125 to add additional users 125 to the messaging group from a database of contacts stored on the user device 115 or from contacts and/or social circles stored in and retrievable from other entities of the system 100, such as the social graph 130. In some embodiments, phone contacts that do not have user accounts for the social network software application 102 and are addressable via a mobile phone number can be added to the messaging group, and the group messaging engine 103 will exchange messages between those phone contacts and the other members of the messaging group via a text messaging protocol, such as SMS. The horizontal scroll region 808 is a horizontally scrollable field for viewing available thumbnails of members of the messaging group associated with the message thread. In some embodiments, selecting an icon depicting a member/user 125 displays an interface showing that member's social stream, profile on the social network, messages or message threads that involve or reference that member, etc.

In FIG. 8A, message fields 810, 812 and 814 each reflect a message of the text message thread, such as an SMS message thread, and are correspondingly labeled with "SMS." Message entry field 816 is a field for inputting the text of the message to be sent to the other members of the messaging group depicted in the horizontal scroll region 808. In some embodiments, upon selecting the message entry field 816 to enter message text, the user interface engine 304 renders a virtual keyboard including a send button for display on the display 329 underneath the message entry field 816. To send a message, the user 125 may enter message text in the message entry field 816 and select the send button to send the message data to the other members of the messaging group. In other embodiments, the user 125 may input and send the message text using a hardware keyboard included in the user device 115. Message text may be entered in reply to a previous message displayed in one of message fields 810, 812 and 814 or may be entered to discuss a new topic with the other members of the message thread.

With reference to FIG. 8B, the user interface 820, which in some embodiments is generated by the user interface engine 304, is a user interface for viewing a native message thread, such as a message thread of messages exchanged via the group messaging engine 103. The user interface 820 may include a window 818 having various components including toolbar buttons 804 and 806, a horizontal scroll region 808, message regions 822, 824, 826 and 828, and a message entry field 816. The toolbar buttons 804 and 806, the horizontal scroll region 808, and the message entry field 816 are described above with reference to FIG. 8A and their description will not be repeated here. Message regions 822, 824, 826 and 828 each reflect a message of a native message thread exchanged via the group messaging engine 103. The messages of the message thread may reflect a conversation between one or more users 125 associated with the message thread. In some embodiments, the messages of the message thread depicted in the user interface 820 are exchanged via the network data connection using a protocol native to the group messaging application 107 and group messaging engine 103. Display of the user interface 820, in some embodiments, may be triggered by selecting message thread region 716 as previously discussed above with respect to FIG. 7.

In other embodiments, the user interface engine 103 may generate a mixed user interface (not shown) depicting a mixed message thread that includes messages exchanged via a variety of messaging services including, but not limited to, ones associated with the group messaging engine 103, SMS, MMS, etc. For example, the user interface could include message regions depicting messages exchanged using the network data connection via the protocol native to group messaging application 107 and group messaging engine 103, as well as messages exchanged via text message (i.e., a fallback messaging service) using an text message-compatible protocol (e.g., SMS) and, in some cases, the fallback data connection. To illustrate the advantages and benefits of a mixed user interface, the following additional non-limiting examples are provided. If a sender/user 125's user device 115 is not coupled to the network 105 via the network data connection, once the sender enters and selects to send the message text, the messaging module 310 receives the input describing the message from the input device 331 and relays the message to the SMS module 302 of the user device 115 for dispatch. In some embodiments, the message is sent by the SMS module 302 to the SMS gateway 150, which is addressable on the mobile network 106 using a fallback identifier generated by or accessible to the group messaging application 107 or included in a previous message received from the group messaging engine 103 and included in the mixed message thread. In other embodiments, the SMS module 302 can send the message data directly to each of the members of the messaging group via text message (e.g., SMS) using mobile phone numbers retrievable from a contact database stored in the memory 337 of the user device 115. For any subsequent messages sent by the sender, the group messaging application 107 can revert back to sending the messages via the network data connection using the native group messaging engine 103 protocol, provided the network data connection is available. Additionally messages sent via the SMS module 302 or another fallback messaging service may be advantageously backed up by the message backup module 312 once a network data connection has been established as previously described above.

FIG. 9 is a graphic representation of a user interface for managing user settings according to some embodiments of the present disclosure. The user interface 900, which may be generated by the user interface engine 304, includes a window 902, a toolbar 904 and user setting toggles 906 and 908. The window 902 is a container for the other elements of the user interface 900. The toolbar 904 includes a label describing the user interface 900 and a return button for returning back to a previous user interface from which the user interface 900 was activated, such as the user interface 700. The toggle 906 is a user-selectable switch that toggles the fallback functionality described herein on or off. For example, if a user 125 does not want to receive or send messages via the fallback data connection when a network data connection is unavailable, the user 125 can switch this functionality off by selecting edit and "off" (not shown). Toggle 908 is a user-selectable switch for sending all messages via the telecommunications server 155 as fallback. While toggles 906 and 908 are primarily described in relation to SMS and the telecommunications server 155, these toggles are applicable to any of the fallback messaging services, protocols, etc., described herein. Additionally, while only two settings are shown as being included in the user interface 900, settings controlling any aspect of the group messaging application 107 and/or group messaging server 103 may be included and are within the scope of the present disclosure.

It should also be understood that the user interfaces 700, 800, 820 and 900 discussed above are merely examples and that interface elements may have a variety of distinct formats, positions within the window, and combinations, all of which are encompassed by the scope of the present disclosure.

A system and methods for integrated messaging have been described. In the above description, for purposes of explanation, numerous specific details are set forth in order to provide a thorough understanding of the disclosure. It should be understood that the technology described in the various example embodiments can be practiced without these specific details. In other instances, structures and devices were shown in block diagram form in order to avoid obscuring the disclosure. For example, the present disclosure was described in some embodiments above with reference to user interfaces and particular hardware. However, the present disclosure applies to any type of computing device that can receive data and commands, and any devices providing services. Moreover, the present disclosure was described above primarily in the context of exchanging messages via various messaging services. However, it should be understood that the present disclosure applies to any type of other data exchange between endpoints.

Reference in the specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium (e.g., memory 237, 337, etc.), such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a non-transitory computer-usable or computer-readable medium can be any apparatus that can contain, store, communicate, propagate or transport the program for use by or in connection with the instruction execution system, apparatus or device. A non-transitory computer-readable storage medium may include any and/or all computer-readable storage media, with the sole exception being a transitory, propagating signal.

A data processing system suitable for storing and/or executing program code will include at least one processor coupled directly or indirectly to memory elements through a system bus. The memory elements can include local memory employed during actual execution of the program code, bulk storage and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer, computing device or other apparatus. Various general-purpose systems may be used with programs in accordance with the teachings herein, or it may prove convenient to construct more specialized apparatus to perform the required method steps. The required structure for a variety of these systems will appear from the description above. In addition, the present disclosure is not described with reference to any particular programming language. It will be appreciated that a variety of programming languages may be used to implement the teachings of the disclosure as described herein.

It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a stand-alone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the scope of the present disclosure, which is set forth in the following claims.

What is claimed is:

1. A method, comprising:
   receiving, at a group messaging application on a user device, user input identifying a recipient and a message to be sent to the recipient;
   determining, by the group messaging application, whether a digital network data channel is available for transmitting the message to a group messaging engine using a native messaging protocol;
   determining, by the group messaging application, whether the recipient is authorized to exchange messages via the group messaging engine by comparing identifying information of the recipient with stored authorization information, wherein the group messaging engine is configured to exchange messages between two or more users using the native messaging protocol;
   responsive to determining that the digital network data channel is available for transmitting the message to the group messaging engine using the native messaging protocol and that the recipient is authorized to exchange messages via the group messaging engine, transmitting, via the group messaging application, and through the digital network data channel, the message to the group messaging engine using the native messaging protocol for dispatch to a user device of the recipient;
   responsive to determining that the digital network data channel is not available for transmitting the message to the group messaging engine using the native messaging protocol, transmitting, by the group messaging application, the message to the user device of the recipient via a fallback messaging service of a mobile network and using a fallback messaging protocol, the fallback messaging service including an SMS or MMS of the mobile network; and
   upon the digital network data channel being reestablished after not being available for transmitting the message to the group messaging engine using the native messaging protocol:
      sending, by the group messaging application, a backup request comprising message data describing the message transmitted using the fallback messaging protocol, the message data including message thread data identifying the message transmitted using the fallback messaging protocol as being connected to one or more other messages, exchanged between the two or more users, to which the message transmitted using the fallback messaging protocol belongs, wherein the backup request causes the message data to be stored at the group messaging engine, and
      sending, by the group messaging application, a restore request to the group messaging engine for retrieving the stored message data stored at the group messaging engine and restoring, based on the message thread data, the message for exchange via the group messaging engine using the native messaging protocol.

2. The method of claim 1, wherein transmitting the message to the user device of the recipient using the fallback messaging protocol includes transmitting the message via SMS or MMS protocol.

3. The method of claim 1, wherein determining whether the digital network data channel is available for transmitting the message using the native messaging protocol further comprises determining whether a data connection to a connection server of the group messaging engine is available for transmitting the message for dispatch via the group messaging engine.

4. The method of claim 1, wherein transmitting, using the fallback messaging protocol, the message to the user device of the recipient includes transmitting instructions to an SMS gateway or a telecommunications server to convert the message to an SMS or MMS message and dispatch the message to the user device of the recipient using the fallback messaging protocol.

5. The method of claim 1, further comprising:
generating an integrated interface for displaying a message previously transmitted for dispatch via the group messaging engine adjacent to a message previously transmitted for dispatch via the fallback messaging service; and
providing the integrated interface for display.

6. The method of claim 5, further comprising:
receiving a message via the fallback messaging service using the fallback messaging protocol;
updating the integrated interface to display the message received via the fallback messaging service adjacent to at least one of the message previously transmitted for dispatch via the group messaging engine and the message previously transmitted for dispatch via the fallback messaging service; and
providing the integrated interface for display.

7. A non-transitory computer readable storage medium storing instructions which, when executed by a processor, cause a computer to:
receive, at a group messaging application on a user device, user input identifying a recipient and a message to be sent to the recipient;
determine, by the group messaging application, whether a digital network data channel is available for transmitting the message to a group messaging engine using a native messaging protocol;
determine, by the group messaging application, whether the recipient is authorized to exchange messages via the group messaging engine by comparing identifying information of the recipient with stored authorization information, wherein the group messaging engine is configured to exchange messages between two or more users using the native messaging protocol;
responsive to determining that the digital network data channel is available for transmitting the message to the group messaging engine using the native messaging protocol and that the recipient is authorized to exchange messages via the group messaging engine, transmit, via the group messaging application, and through the digital network data channel, the message to the group messaging engine using the native messaging protocol for dispatch to a user device of the recipient;
responsive to determining that the digital network data channel is not available for transmitting the message to the group messaging engine using the native messaging protocol, transmit, by the group messaging application, the message to the user device recipient via a fallback messaging service of a mobile network and using a fallback messaging protocol, the fallback messaging service including an SMS or MMS of the mobile network; and
upon the digital network data channel being reestablished after not being available for transmitting the message to the group messaging engine using the native messaging protocol:
send, by the group messaging application, a backup request comprising message data describing the message transmitted using the fallback messaging protocol, the message data including message thread data identifying the message transmitted using the fallback messaging protocol as being connected to one or more other messages, exchanged between the two or more users, to which the message transmitted using the fallback messaging protocol belongs, wherein the backup request causes the message data to be stored at the group messaging engine, and
send, by the group messaging application, a restore request to the group messaging engine for retrieving the stored message data stored at the group messaging engine and restoring, based on the message thread data, the message for exchange via the group messaging engine using the native messaging protocol.

8. The non-transitory computer readable storage medium of claim 7, wherein transmitting the message to the user device of the recipient using the fallback messaging protocol includes transmitting the message via SMS or MMS protocol.

9. The non-transitory computer readable storage medium of claim 7, wherein determining whether the digital network data channel is available for transmitting the message using the native messaging protocol comprises determining whether a data connection to a connection server of the group messaging engine is available for transmitting the message for dispatch via the group messaging engine.

10. The non-transitory computer readable storage medium of claim 7, wherein transmitting, using the fallback messaging protocol, the message to the user device of the recipient via the fallback messaging service includes transmitting instructions to an SMS gateway or a telecommunications server to convert the message to an SMS or MMS message and dispatch the message to the user device of the recipient using the fallback messaging protocol.

11. The non-transitory computer readable storage medium of claim 7, wherein the instructions, when executed by the processor, further cause the computer to:
generate an integrated interface for displaying a message previously transmitted for dispatch via the group messaging engine adjacent to a message previously transmitted for dispatch via the fallback messaging service; and
provide the integrated interface for display.

12. The non-transitory computer readable storage medium of claim 11, wherein the instructions, when executed by the processor, further cause the computer to:
receive a message via the fallback messaging service using the fallback messaging protocol;
update the integrated interface to display the message received via the fallback messaging service adjacent to at least one of the message previously transmitted for dispatch via the group messaging engine and the message previously transmitted for dispatch via the fallback messaging service; and
provide the integrated interface for display.

13. An apparatus, comprising:
a processor;
a memory coupled to the processor;
a user interface engine stored in the memory and executable by the processor to receive input identifying a recipient and a message to be sent to the recipient;
an authorization module stored in the memory and coupled to the user interface engine, the authorization module executable by the processor to determine whether the recipient is authorized to exchange messages via a group messaging engine by comparing identifying information of the recipient with stored authorization information, wherein the group messaging engine is configured to exchange messages between two or more users using a native messaging protocol; and a messaging module stored in the memory and coupled to the authorization module and the user interface engine, the messaging module executable by the processor to,
  responsive to (i) receiving an indication that a digital network data channel is available for transmitting the message to the group messaging engine using the native messaging protocol, and (ii) receiving an indication that the recipient is authorized to exchange messages via the group messaging engine, transmit the message to the group messaging engine, through the digital network data channel and using the native messaging protocol for dispatch to a user device of the recipient via the group messaging engine,
  responsive to receiving an indication that the digital network data channel is not available for transmitting the message to the group messaging engine using the native messaging protocol, transmit the message to the user device of the recipient via a fallback messaging service of a mobile network and using a fallback messaging protocol, the fallback messaging service including an SMS or MMS of the mobile network, and
  upon the digital network data channel being reestablished after not being available for transmitting the message to the group messaging engine using the native messaging protocol:
    sending a backup request comprising message data describing the message transmitted using the fallback messaging protocol, the message data including message thread data identifying the message transmitted using the fallback messaging protocol as being connected to one or more other messages exchanged between the two or more users, to which the message transmitted using the fallback messaging protocol belongs, wherein the backup request causes the message data to be stored at the group messaging engine, and
    sending a restore request to the group messaging engine for retrieving the stored message data stored at the group messaging engine and restoring, based on the message thread data, the message for exchange via the group messaging engine using the native messaging protocol.

14. The apparatus of claim 13, further comprising a persistence module stored in the memory and coupled to the messaging module, the persistence module executable by the processor to provide connection data identifying an availability of a data connection to the group messaging engine, wherein the messaging module is configured to selectively transmit the message for dispatch to the user device of the recipient via the group messaging engine or the fallback messaging service based at least in part on the connection data.

15. The apparatus of claim 13, wherein the messaging module is configured to, responsive to receiving an indication that the recipient is not authorized to exchange messages via the group messaging engine, transmit the message via SMS or MMS protocol to the SMS or MMS of the mobile network, respectively, for dispatch to the user device of the recipient.

16. The apparatus of claim 13, further comprising a user settings module stored in the memory and coupled to the messaging module, the user settings module executable by the processor to provide a user-configurable setting associated with a sender of the message, wherein the messaging module is further configured to selectively transmit the message based at least in part on the user-configurable setting.

17. The apparatus of claim 13, wherein a user-configurable setting includes a setting for instructing the messaging module to transmit the message to the user device of the recipient via the fallback messaging service.

18. The apparatus of claim 13, further comprising a message backup module stored in the memory and executable by the processor to transmit the message to the group messaging engine for storage, wherein the message corresponds to a message previously transmitted for dispatch to the user device of the recipient via the fallback messaging service.

* * * * *